US012264800B2

(12) United States Patent
Thieme et al.

(10) Patent No.: US 12,264,800 B2
(45) Date of Patent: Apr. 1, 2025

(54) VEHICLE LIGHT ASSEMBLY HAVING A LIGHT PROJECTION APPARATUS

(71) Applicant: Harley-Davidson Motor Company, Inc., Milwaukee, WI (US)

(72) Inventors: Bryan Thieme, Milwaukee, WI (US); Robert Widick, Milwaukee, WI (US)

(73) Assignee: Harley-Davidson Motor Company, Inc., Milwaukee, WI (US)

( * ) Notice: Subject to any disclaimer, the term of this patent is extended or adjusted under 35 U.S.C. 154(b) by 0 days.

(21) Appl. No.: 18/644,883

(22) Filed: Apr. 24, 2024

(65) Prior Publication Data

US 2024/0360977 A1 Oct. 31, 2024

Related U.S. Application Data

(60) Provisional application No. 63/498,149, filed on Apr. 25, 2023.

(51) Int. Cl.
| | |
|---|---|
| *F21S 43/00* | (2018.01) |
| *F21S 43/20* | (2018.01) |
| *F21W 103/35* | (2018.01) |
| *F21W 103/20* | (2018.01) |
| *F21W 107/17* | (2018.01) |

(52) U.S. Cl.
CPC ............. *F21S 43/601* (2024.05); *F21S 43/20* (2018.01); *F21W 2103/20* (2018.01); *F21W 2103/35* (2018.01); *F21W 2107/17* (2018.01)

(58) Field of Classification Search
CPC ........... F21W 2103/20; F21W 2103/35; F21W 2107/17; F21S 43/20; F21S 43/601
See application file for complete search history.

(56) References Cited

U.S. PATENT DOCUMENTS

| | | | |
|---|---|---|---|
| 8,733,939 B2 | 5/2014 | Othmer | |
| 9,481,287 B2 | 11/2016 | Marti et al. | |
| 10,195,980 B2 | 2/2019 | Widdowson et al. | |
| 10,391,933 B2 | 8/2019 | Schmidt et al. | |
| 10,974,642 B2 | 4/2021 | Boilevin et al. | |
| 2020/0300435 A1* | 9/2020 | Mandl | F21S 41/143 |
| 2023/0271548 A1* | 8/2023 | Shibata | B60Q 1/50 340/468 |
| 2024/0059214 A1* | 2/2024 | Suzuki | H05B 47/16 |

\* cited by examiner

*Primary Examiner* — Anne M Hines
(74) *Attorney, Agent, or Firm* — Jordan IP Law, LLC

(57) ABSTRACT

A vehicle, a vehicle light system, a light projection apparatus for implementation in the vehicle light system, a computer-implemented method of operating a vehicle, and a computer program product for operating a vehicle. The light projection apparatus is controlled to generate one or more projections of a graphical image, pattern, text, symbol, character, geometric shape, indicia, or combinations thereof on a target roadway surface (e.g., projection surface, road surface, etc.) to visually indicate an intended or actual implementation of a vehicle maneuver (e.g., change of lane and/or left or right turn) and/or an intended actuation of the vehicle braking. The one or more projection(s) would be supplemental to the use of forward and rear turn signal light indicators.

18 Claims, 18 Drawing Sheets

VEHICLE LIGHT ASSEMBLY HAVING A LIGHT PROJECTION APPARATUS

CROSS REFERENCE TO RELATED APPLICATION

This Application claims benefit to U.S. Provisional Application No. 63/498,149, filed Apr. 25, 2023, which is incorporated by reference herein in its entirety for all purposes.

TECHNICAL FIELD

The present disclosure relates to generally to a vehicle, a vehicle light system, a light projection apparatus for implementation in the vehicle light system, a computer-implemented method of operating a vehicle, and a computer program product for operating a vehicle. The light projection apparatus is controlled to generate one or more projections of a graphical image, pattern, text, symbol, character, geometric shape, indicia, or combinations thereof on a target roadway surface (e.g., projection surface, road surface, etc.) to visually indicate an intended or actual implementation of a vehicle maneuver (e.g., change of lane and/or left or right turn) and/or an intended actuation of the vehicle braking. The one or more projection(s) would be supplemental to the use of forward and rear turn signal light indicators.

BACKGROUND

Vehicles such as motorcycles generally include front turn signal lights and rear turn signal lights to visually indicate an intention of the vehicle operator or rider to implement a vehicle maneuver (e.g., change of lane, and/or left or right turn, and/or braking sequence) and/or an actuation of the vehicle braking while operating on a roadway.

SUMMARY

One or more embodiments relate to a vehicle, a vehicle light system, a light projection apparatus for implementation in the vehicle light system, a computer-implemented method of operating a vehicle, and a computer program product for operating a vehicle.

BRIEF DESCRIPTION OF DRAWINGS

The various advantages of the exemplary embodiments will become apparent to one skilled in the art by reading the following specification and appended claims, and by referencing the following drawings, in which:

FIGS. 6A and 6B respectively illustrate an example vehicle light system projecting light on a target roadway surface to visually indicate a right turn.

DESCRIPTION

Figure 1:
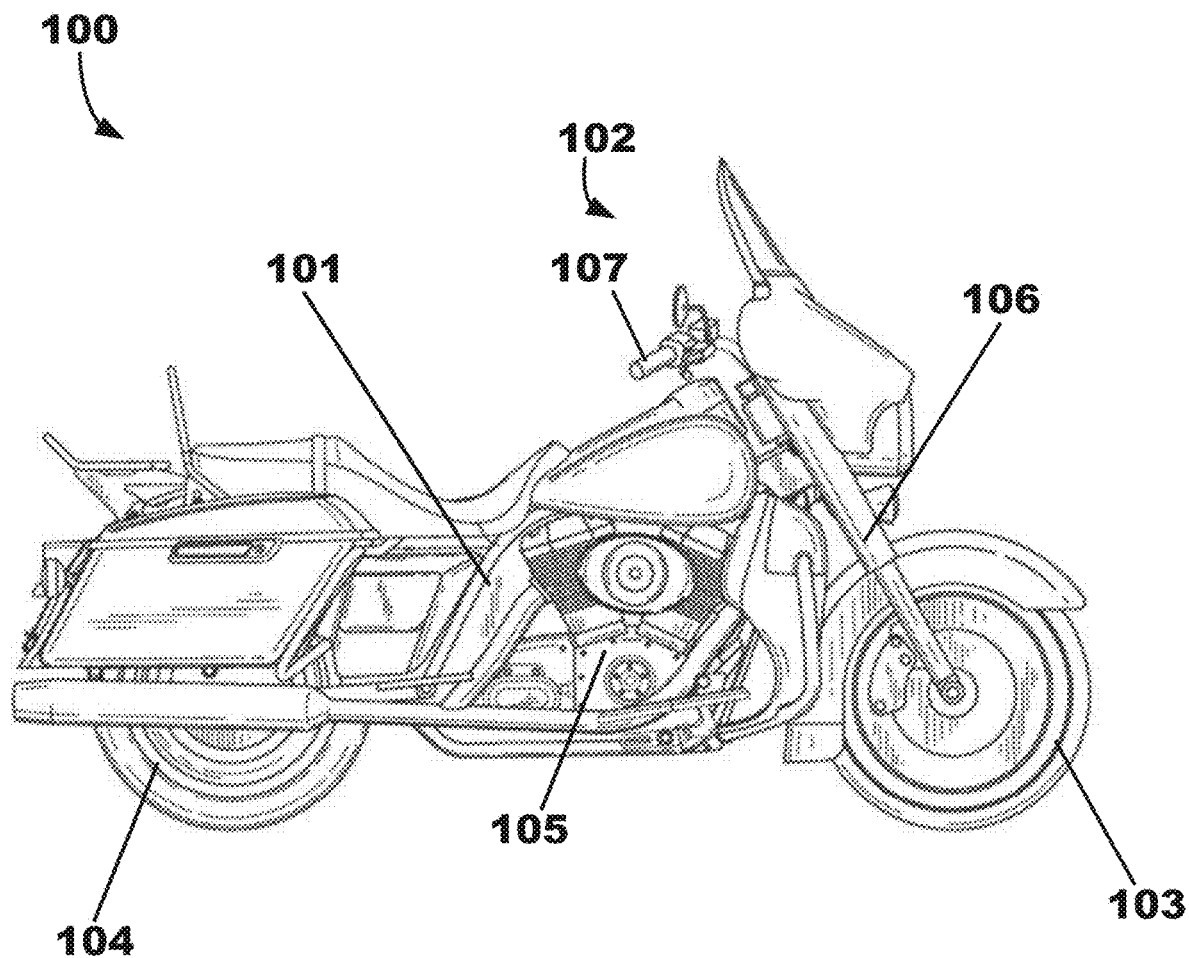
FIGS. 1 and 2 respectively illustrate an example of an example vehicle, in accordance with one or more embodiments set forth, shown, and described herein.
Figure 2:
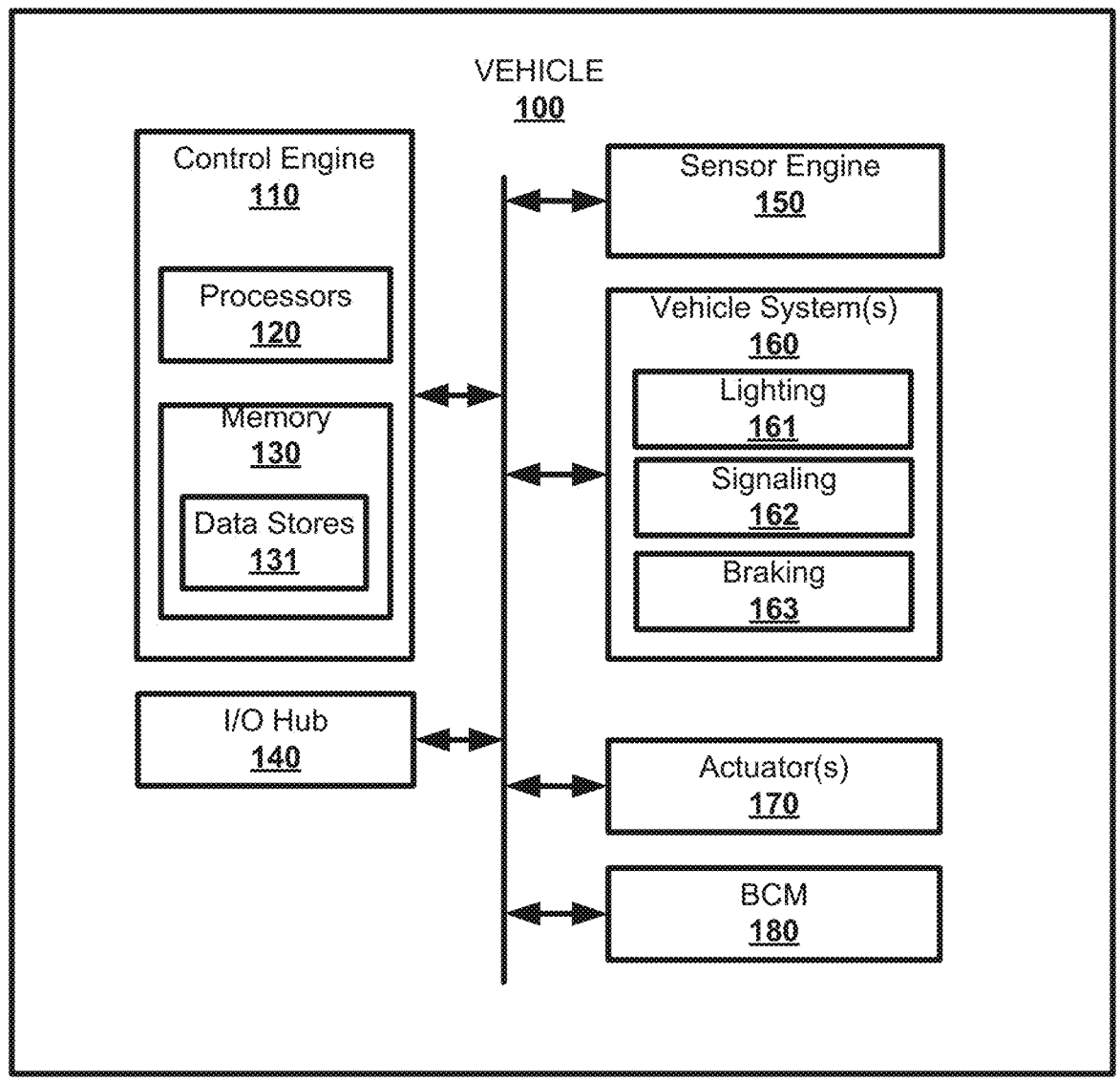

Turning to the figures, in which FIGS. 1 and 2 respectively illustrate a vehicle 100, in accordance with one or more embodiments. In accordance with one or more embodiments, a "vehicle" may be in reference to any form of motorized transport. In the illustrated embodiment of FIGS. 1 and 2, the vehicle 100 comprises a two-wheeled vehicle such as a motorcycle. Embodiments, however, are not limited thereto, and thus, this disclosure contemplates the vehicle comprising a three-wheeled vehicle, a four-wheeled vehicle or any suitable vehicle that falls within the spirit and scope of the principles of this disclosure.

In accordance with one or more embodiments, the vehicle 100 may comprise one or more operational elements. Some of the possible operational elements of the vehicle 100 are shown in FIGS. 1 and 2 and will now be described. It will be understood that it is not necessary for the vehicle 100 to have all the elements illustrated in FIG. 1 and/or described herein. The vehicle 100 may have any combination of the various elements illustrated in FIGS. 1 and 2. Moreover, the vehicle 100 may have additional elements to those illustrated in FIGS. 1 and 2, or may not include one or more of the elements shown in FIGS. 1 and 2. Moreover, while the various operational elements are illustrated as being located within the vehicle 100, embodiments are not limited thereto, and thus, one or more of the operational elements may be located external to the vehicle 100, and even physically separated by large spatial distances.

As illustrated in FIG. 1, the vehicle 100 comprises a vehicle structure 101 (e.g., chassis, frame, subframe, body, front/rear forks, etc.), a steering assembly 102 pivotably mounted to the vehicle structure 101, a front wheel 103 rotatably mounted to the steering assembly 102, a rear wheel 104 rotatably mounted to the vehicle structure 101, and an engine 105 operatively connected to the vehicle structure 101. The steering assembly 102 includes forks 106, handlebars 107, and controls coupled to the handlebars 107 to facilitate control of the vehicle 100 by a vehicle operator.

As illustrated in FIG. 2, the vehicle 100 further comprises a controller or control engine 110 comprising one or more processors 120, a non-transitory memory 130 operatively coupled to the one or more processors 120, an I/O hub 140, a sensor engine 150, one or more vehicle systems 160, one or more actuators 170, and a body control module (BCM) 180.

As set forth, described, and/or illustrated herein, "processor" means any component or group of components that are operable to execute any of the processes described herein or any form of instructions to carry out such processes or cause such processes to be performed. The one or more processors 120 may be implemented with one or more general-purpose and/or one or more special-purpose processors 120. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 120 may comprise at least one hardware circuit (e.g., an integrated circuit) operable to carry out instructions contained in program code. In embodiments in which there is a plurality of processors 120, such processors 120 may work independently from each other, or one or more processors 120 may work in combination with each other.

The memory 130 comprises a set of instructions of computer-executable program code. The set of instructions are executable by the one or more processors 120 to cause execution of one or more software applications that reside in the memory 130. The memory 130 includes one or more data stores 131 that are operable to store one or more types of data. The one or more data stores 131 may comprise volatile and/or non-volatile memory. Examples of suitable data stores 131 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 131 may be a component of the one or more processors 120 or alternatively, may be operatively connected to the one or more processors 120 for use thereby. As set forth, described, and/or illustrated herein, "operatively connected" may include direct or indirect connections, including connections without direct physical contact.

The I/O hub 140 is operatively connected to other vehicle components and vehicle systems 160. The I/O hub 140 may comprise an input interface, an output interface, and a network controller to facilitate communications between one or more vehicles 100. The input interface and the output interface may be integrated as a single, unitary interface, or alternatively, be separate as independent interfaces that are operatively connected.

The input interface is defined herein as any apparatus, device, component, system, element, or arrangement or groups thereof that enable information/data to be entered in a machine. The input interface may receive an input from a vehicle occupant (e.g. a driver or a passenger) or a remote operator of the vehicle 100. In an example, the input interface may comprise a user interface (UI), graphical user interface (GUI) such as, for example, a display, human-machine interface (HMI), or the like. Embodiments, however, are not limited thereto, and thus, the input interface may comprise a keypad, touch screen, multi-touch screen, button, joystick, mouse, trackball, microphone and/or combinations thereof.

The output interface is defined herein as any apparatus, device, component, system, element or arrangement or groups thereof that enable information/data to be presented to a vehicle occupant and/or remote operator of the vehicle 100. The output interface may be operable to present information/data to the vehicle occupant and/or the remote operator. The output interface may comprise one or more of a visual display or an audio display such as a microphone, earphone, and/or speaker. One or more components of the vehicle 100 may serve as both a component of the input interface and a component of the output interface.

The sensor engine 150 comprises one or more sensors operable, at least during operation of the vehicle 100, to dynamically detect, determine, capture, assess, monitor, measure, quantify, and/or sense information about the vehicle 100 and a driving environment external to the vehicle 100. In one example, the sensor engine 150 is operable to dynamically detect, determine, capture, assess, monitor, measure, quantify, and/or sense information about the vehicle systems 160. As set forth, described, and/or illustrated herein, "sensor" means any apparatus, device, component and/or system that can perform one or more of detecting, determining, assessing, monitoring, measuring, quantifying, and sensing something. The one or more sensors are operable to detect, determine, capture, assess, monitor, measure, quantify and/or sense in real-time. As set forth, described, and/or illustrated herein, "real-time" means a level of processing responsiveness that a user or system senses as sufficiently immediate for a particular process or determination to be made, or that enables the processor to keep up with some external process. The one or more sensors may work independently from each other, or alternatively, may work in combination with each other. The sensors may be used in any combination, and may be used redundantly to validate and improve the accuracy of the detection.

During operation of the vehicle 100, the one or more processors 120 of the control engine 110 may be operable to selectively activate one or more of the sensors to sense the external driving environment of the vehicle 100 based on current external environmental conditions including, but not limited to, the roadway, other vehicles, objects, adjacent lanes, traffic rules, objects on the roadway, etc.

The one or more vehicle systems 160 include, but are not limited to, a light system 161, a signaling system 162, and a braking system 163. Embodiments, however, are not limited thereto, and thus, this disclosure contemplates the vehicle 100 comprising more, fewer, or different systems. In one example, the sensor engine 150 is operable to dynamically detect, determine, capture, assess, monitor, measure, quantify, and/or sense actuation of vehicle signaling via signaling system 162, vehicle braking via braking system 163, etc.

The light system 161, controlled by the control engine 110, is operable to provide illuminating light to the external driving environment of the vehicle 100 The light system 161 may comprise or one or light devices or apparatus (e.g., vehicle headlamps) having an adaptive driving beam (ADB) controller operable to control one or more light sources. The ADB controller may comprise one or more processors and one or more data stores. The ADB controller may be operatively connected to the control engine 110, and thus, may be in communication to transmit and/or receive information from the light system 161 to control the light devices.

The signaling system 162 may comprise one or more mechanisms, devices, elements, components, systems, and/or combinations thereof (now known or later developed), configured to provide illumination for the vehicle driver or operator, and/or to provide information with respect to one or more aspects of the vehicle 100. For instance, the signaling system 162 may provide information regarding the presence, position, size, direction of travel of the vehicle 100, and/or the intentions of the vehicle driver or operator regarding a direction and speed of travel of the vehicle 100.

Figure 3:
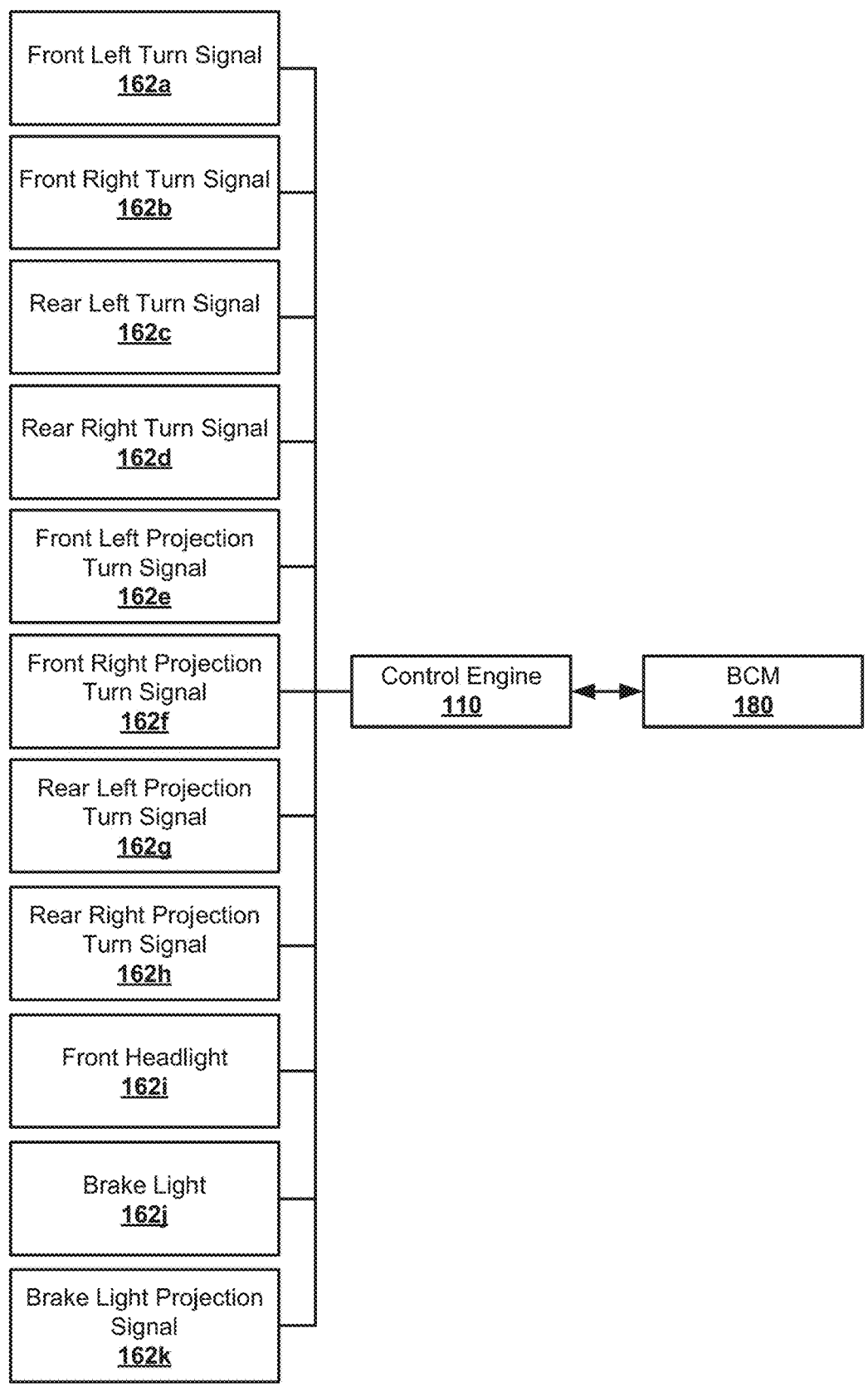
FIG. 3 illustrates an example block control diagram of an example vehicle light system for implementation in the example vehicle, in accordance with one or more embodiments set forth, shown, and described herein.

As illustrated in FIG. 3, the control engine 110 and BCM 180 are in operative communication to facilitate control of the signaling system 162. The signaling system 162 comprises a pair of front turn signal lights 162a, 162b mounted on the vehicle structure 101 at a front mounting location, a pair of rear turn signal lights 162c, 162d mounted on the vehicle structure 101 at a rear mounting location, a pair of front projection turn signal lights 162e, 162g, a pair of rear projection turn signal lights 162f, 162h, a front headlight 162i, a brake light 162j, and a brake light projection signal 162k. The color of light projected by the front projection turn signal lights 162e, 162g, the rear projection turn signal lights 162f, 162h, and the brake light projection signal 162k may a single color, or any suitable color combination. The braking system 163 may comprise one or more mechanisms, devices, elements, components, systems, and/or combinations thereof (now known or later developed), configured to decelerate the vehicle 100.

Figure 4:
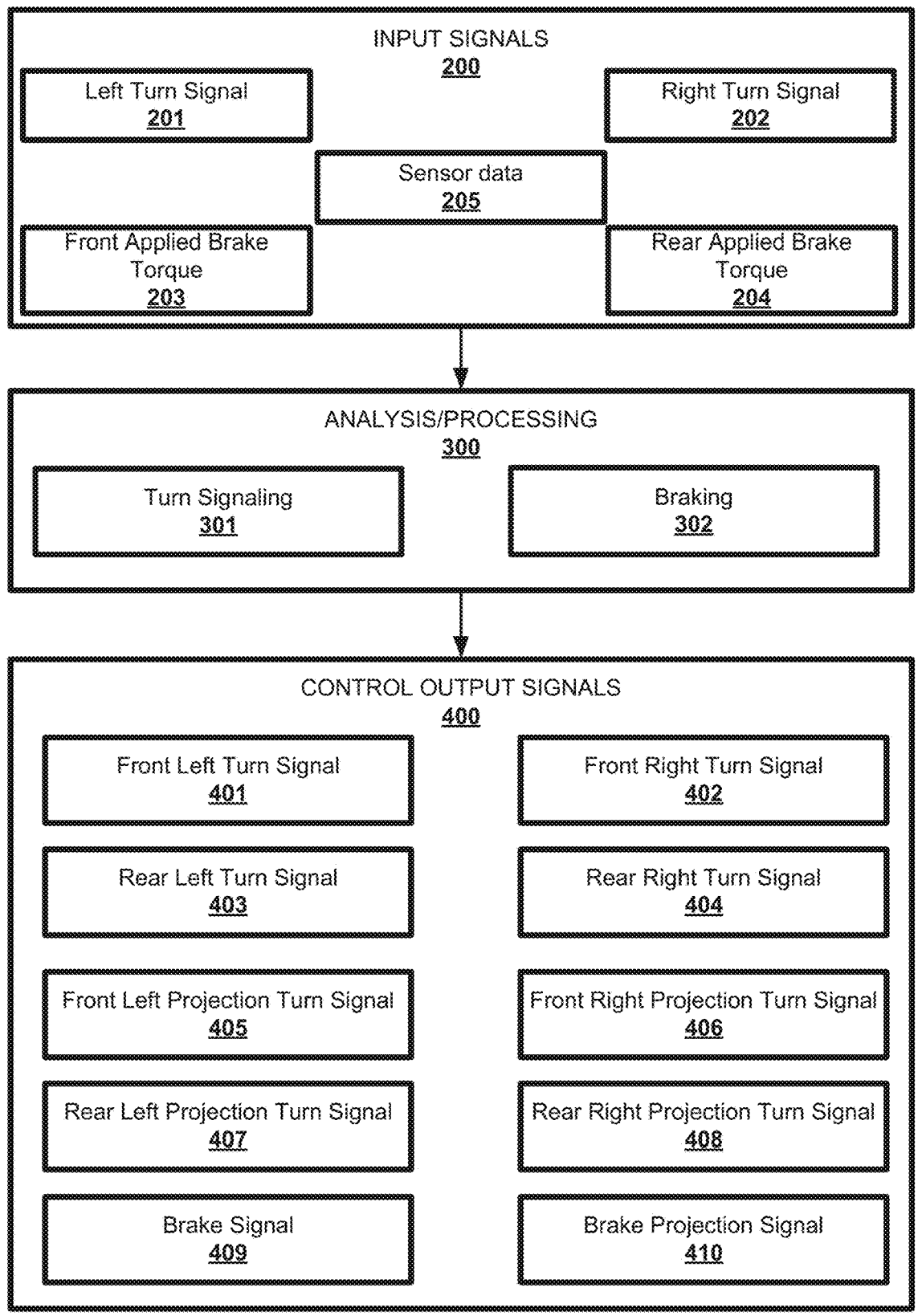
FIG. 4 illustrates a block diagram of control blocks for implementation in the example vehicle light system, in accordance with one or more embodiments set forth, shown, and described herein.

As illustrated in FIG. 4, in accordance with one or more embodiments, during operation of the vehicle 100, the control engine 110 is operable to receive/acquire/capture one or more input signals 200 related to a driving maneuver intended to be implemented by the vehicle driver or operator. The input signals 200 include, but are not limited to, a left turn signal 201, a right turn signal 202, front (wheel) applied brake torque 203, rear (wheel) applied brake torque 204, and sensor data 205. The turn input signals 201, 202 indicate an intention of the vehicle driver or operator to make a turn or lane change, whereas the applied brake torque input signals 203, 204 indicate an actual deceleration of the vehicle 100 by actuating the front brakes and/or the rear brakes. The sensor data 205 relates, but is not limited to, the external driving environment of the vehicle 100. The vehicle maneuver comprises a turn by the vehicle 100, a change of lane by the vehicle 100, or actuation of the front brake and/or rear brake.

The one or more processors 120 of the control engine 110, in response to receipt/acquisition/capture of an input signal, are then operable to dynamically conduct an analysis 300 of the input signal. The analysis may include turn signaling analysis 301 in response to receipt of one or more turn input signals 201, 202, and a brake analysis 302 in response to receipt of one or more applied brake torque input signals 203, 204. In response to execution of the analysis 300 of one or more input signals, the control engine 110 via the one or more processors 120, may then transmit one or more command output signals 400 to the light system 160 to control one or more of the lights. The input signals may be associated with an action taken by the vehicle driver or operator.

In one example driving operation, the vehicle driver or operator may engage a turn signal switch temporally before (or during) implementing a vehicle maneuver comprising a left turn. In response to receipt/acquisition of an input signal 201 associated with the intended or actual implementation of the vehicle maneuver, the control engine 110 can transmit a plurality of control output signals 400 to cause a visual indication of the intended or actual implementation of the left turn to be seen by vehicles and/or pedestrians on or adjacent to the roadway. In particular, the control engine 110 can transmit a first control output signal 401 to cause the front left turn signal 161a to emit illuminating light (blinking) to visually indicate the intended or actual implementation of the left turn. The control engine 110 can also concurrently transmit a second control output signal 403 to cause the rear left turn signal 161c to emit illuminating light (blinking) to visually indicate the intended or actual implementation of the left turn.

Figure 5A:
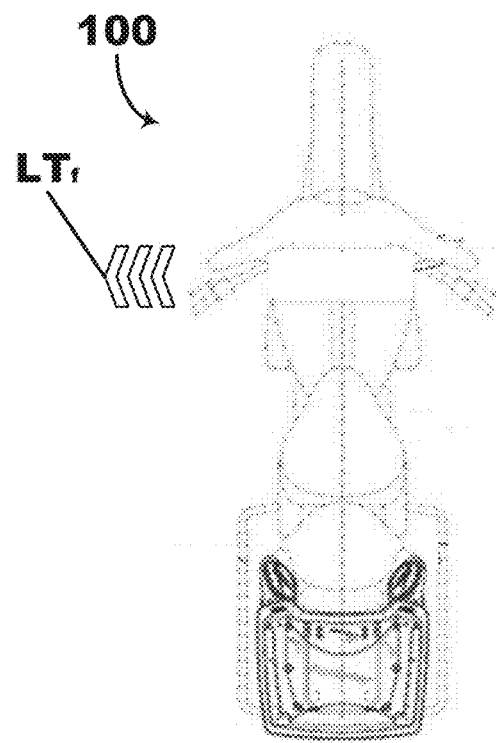
FIGS. 5A and 5B respectively illustrate an example vehicle light system projecting light on a target roadway surface to visually indicate a left turn.

As illustrated in FIG. 5A, in accordance with one or more example embodiments, the control engine 110 can also concurrently transmit a third control output signal 405 to cause the front left projection turn signal 162e to project light $LT_f$ from the vehicle structure 101 on a TRS. A TRS may encompass a 2D TRS and/or a 3D TRS. The projected light $LT_f$ is oriented in a direction generally orthogonal to a driving direction of the vehicle 100 to visually indicate the intended or actual implementation of the left turn. The projected light $LT_f$ comprises one or more graphical images, patterns, text, symbols, characters, geometric shapes, indicia, or combinations thereof.

Figure 5B:
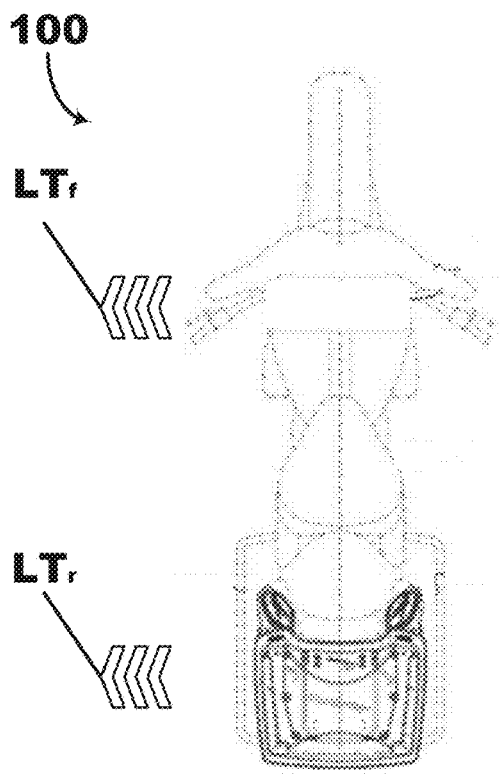

As illustrated in FIG. 5B, in accordance with one or more example embodiments, the control engine 110 can also concurrently transmit a fourth control output signal 407 to cause the rear left projection turn signal 162g to project light $LT_r$ from the vehicle structure 101 in a predetermined sequence on the TRS. The projected light $LT_r$ is oriented in a direction generally orthogonal to a driving direction of the vehicle 100 to further visually indicate the intended or actual implementation of the left turn. The projected light $LT_r$ comprises one or more graphical images, patterns, text, symbols, characters, geometric shapes, indicia, or combinations thereof.

The one or more graphical images, patterns, text, symbols, characters, geometric shapes, indicia, or combinations thereof formed by the projected light $LT_r$ from the rear left projection turn signal 162g may correspond to or be the same as the one or more graphical images, patterns, text, symbols, characters, geometric shapes, indicia, or combinations thereof formed by the $LT_f$ from the front left projection turn signal 162e. Alternatively, the one or more graphical images, patterns, text, symbols, characters, geometric shapes, indicia, or combinations thereof formed by the projected light $LT_r$ from the rear left projection turn signal 162g may not correspond to or be different than the one or more graphical images, patterns, text, symbols, characters, geometric shapes, indicia, or combinations thereof formed by the $LT_f$ from the front left projection turn signal 162e.

In another example driving operation, the vehicle driver or operator may engage a turn signal switch temporally before (or during) implementing a vehicle maneuver comprising a right turn. In response to receipt/acquisition of an input signal 202 associated with the intended or actual implementation of the vehicle maneuver, the control engine 110 can transmit a plurality of control output signals 400 to cause a visual indication of the intended or actual implementation of the right turn to be seen by vehicles and/or pedestrians on or adjacent to the roadway. In particular, the control engine 110 can transmit a fifth control output signal 402 to cause the front right turn signal 162b to emit illuminating light (blinking) to visually indicate the intended or actual implementation of the right turn. The control engine 110 can also concurrently transmit a sixth control output signal 404 to cause the rear right turn signal 162*d* to emit illuminating light (blinking) to visually indicate the intended or actual implementation of the right turn.

As illustrated in FIG. 6A, in accordance with one or more example embodiments, the control engine 110 can also concurrently transmit a seventh control output signal 406 to cause the front right projection turn signal 162*f* to project light $RT_f$ from the vehicle structure 101 in a predetermined sequence on the TRS. The projected light $RT_f$ is oriented in a direction generally orthogonal to a driving direction of the vehicle 100 to visually indicate the intended or actual implementation of the right turn. The projected light $RT_f$ comprises one or more graphical images, patterns, text, symbols, characters, geometric shapes, indicia, or combinations thereof.

Figure 6B:
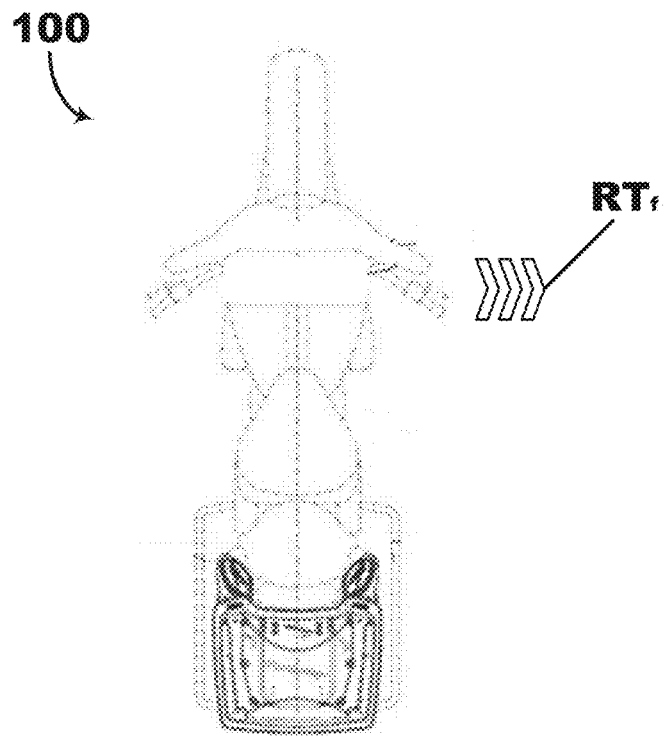
Figure 6B:
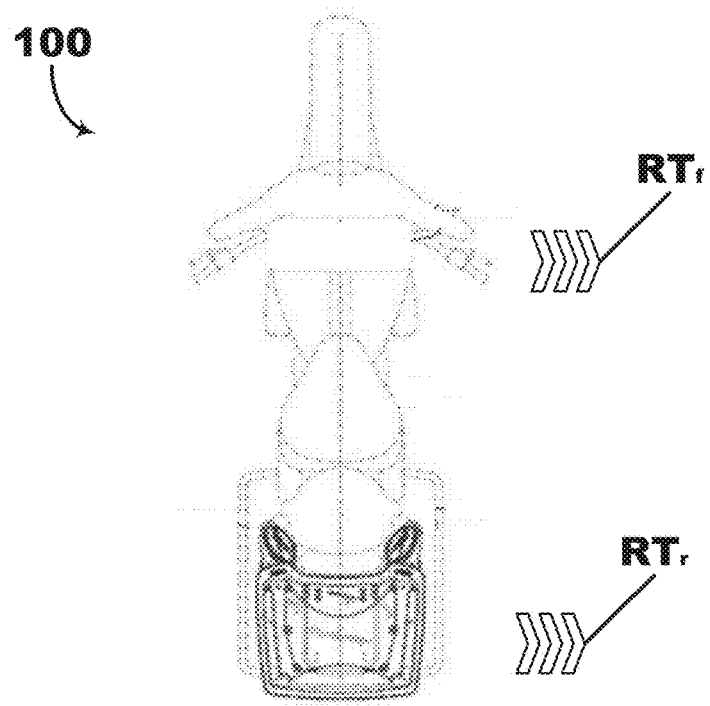

As illustrated in FIG. 6B, in accordance with one or more example embodiments, the control engine 110 can also concurrently transmit an eighth control output signal 408 to cause the rear right projection turn signal 162*h* to project light $RT_r$ from the vehicle structure 101 in a predetermined sequence on the TRS. The projected light $RT_r$ is oriented in a direction generally orthogonal to a driving direction of the vehicle 100 to further visually indicate the intended or actual implementation of the left turn. The projected light $RT_r$ comprises one or more graphical images, patterns, text, symbols, characters, geometric shapes, indicia, or combinations thereof.

The one or more graphical images, patterns, text, symbols, characters, geometric shapes, indicia, or combinations thereof formed by the projected light $RT_r$ from the rear right projection turn signal 162*h* may correspond to or be the same as the one or more graphical images, patterns, text, symbols, characters, geometric shapes, indicia, or combinations thereof formed by the projected light $RT_f$ from the front right projection turn signal 162*f*. Alternatively, the one or more graphical images, patterns, text, symbols, characters, geometric shapes, indicia, or combinations thereof formed by the projected light $RT_r$ from the rear right projection turn signal 162*h* may not correspond to or be different than the one or more graphical images, patterns, text, symbols, characters, geometric shapes, indicia, or combinations thereof formed by the $RT_r$ from the front right projection turn signal 162*f*.

In an additional example driving operation that involves a driving maneuver temporally before (or during) implementing a vehicle maneuver to an adjacent target lane of a target roadway surface (TRS), the one or more processors 120 of the control engine 110, in response to receiving/acquiring/capturing one or more input signals 200 related to the driving maneuver, may be operable to selectively activate one or more of the sensors to detect (as sensor data) a presence of an object (e.g., a vehicle) in one or more regions of the adjacent target lane of the TRS (e.g., the adjacent target lane and an adjacent lane in an opposite direction to the adjacent target lane). In response to receipt/acquisition/capture of an input signal 205 associated with a detection of a presence of an object in the adjacent target lane, the one or more processors 120 of the control engine 110 may be further operable to dynamically conduct an analysis 300 of the input signal 205 to determine whether to cause a projection turn signal or cause an adjustment to the position/location of the projection turn signal. The analysis 300 may be based on a threshold spatial distance between the detected object and the vehicle structure 101. In response to execution of the analysis 300 of the input signal 205, the one or more processors 120 of the control engine 110 may then transmit one or more command output signals 400 to the light system 160 to prevent a projection turn signal from projecting light from the vehicle structure 101 on the adjacent target lane of the TRS. Alternatively, the one or more processors 120 of the control engine 110 may be operable to transmit one or more command output signals 400 to the light system 160 to cause the light system 160 to adjust placement/location of the projection turn signal from a first (default) location to a second (alternative) location. For example, the second (alternative) location of the projection turn signal may comprise another region of the adjacent target lane of the TRS, or the adjacent lane where there is no detected object that is in the opposite direction to the adjacent target lane, or on the detected object.

In a further example driving operation, in response to receipt/acquisition of an input signal 203 associated with deceleration of the vehicle 100 by engaging the front brake or the rear brake, the control engine 110 can transmit a plurality of control output signals 400 to cause a visual indication of the braking of the vehicle 100 to be seen by vehicles and/or pedestrians on or adjacent to the roadway. In particular, the control engine 110 can transmit a ninth control output signal 409 to cause the brake light 162*j* to illuminate to visually indicate the braking of the vehicle 100.

Figure 7:
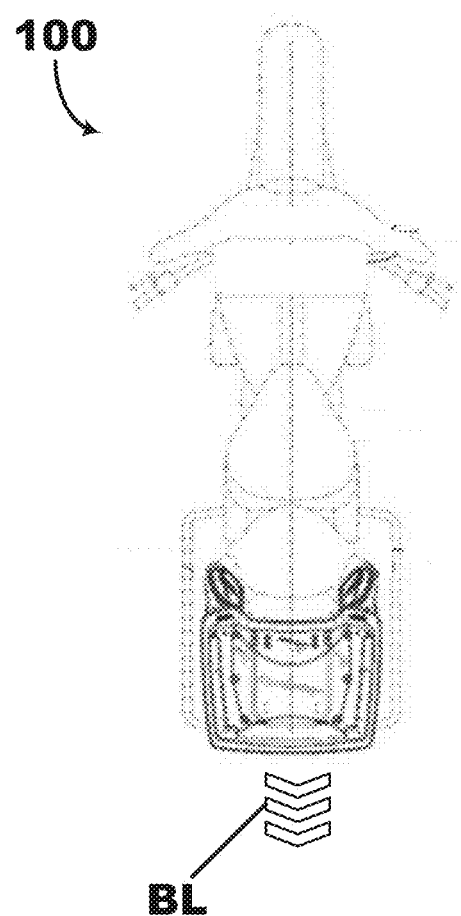
FIG. 7 illustrates an example vehicle light system projecting light on a target roadway surface to visually indicate actuation of the vehicle brakes.

As illustrated in FIG. 7, in accordance with one or more example embodiments, the control engine 110 can also concurrently transmit a tenth control output signal 410 to cause the brake light projection signal 162*k* to project light BL in a predetermined sequence on the TRS. The projected light BL is oriented in a direction generally aligned with or parallel to a driving direction of the vehicle 100 to further visually indicate the intended actuation of the vehicle braking. The projected light BL comprises one or more graphical images, patterns, text, symbols, characters, geometric shapes, indicia, or combinations thereof.

In accordance with one or more example embodiments, the one or more graphical images, patterns, text, symbols, characters, geometric shapes, indicia, or combinations thereof formed by the projected lights $LT_f$, $LT_r$, $RT_f$, $RT_r$, and BL may correspond to each other. Alternatively, the one or more graphical images, patterns, text, symbols, characters, geometric shapes, indicia, or combinations thereof formed by the projected lights $LT_f$, $LT_r$, $RT_f$, $RT_r$, and BL may not correspond to each other or be different than each other.

Figure 8:
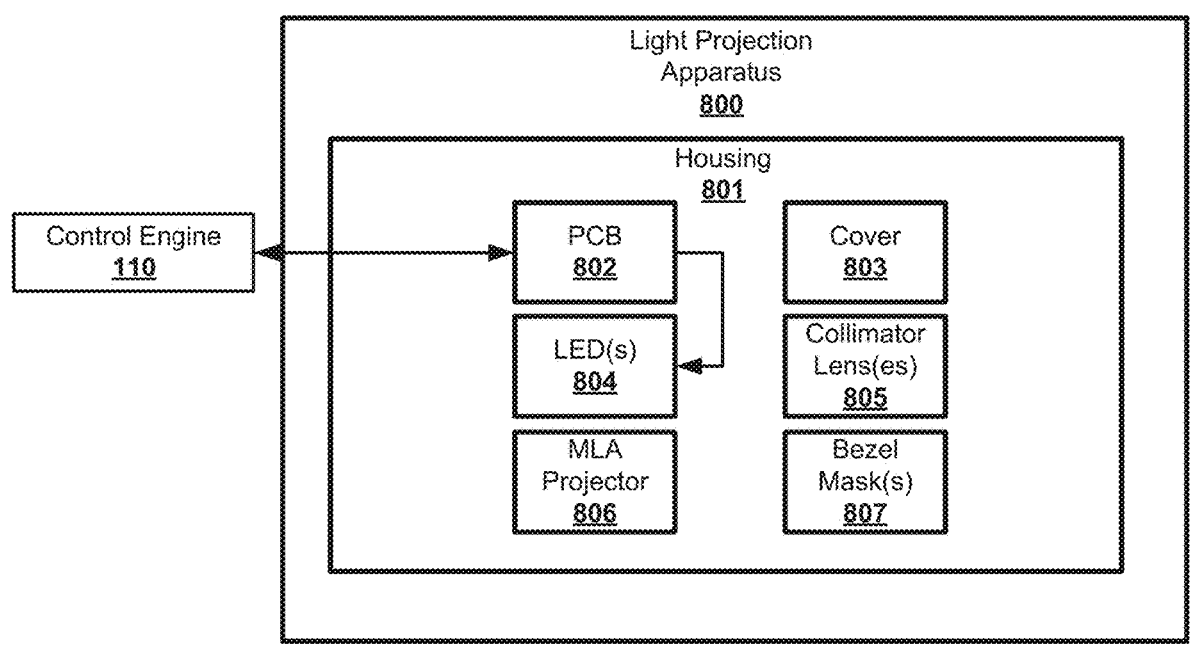
FIG. 8 illustrates an example vehicle light system for implementation in the example vehicle, in accordance with one or more embodiments set forth, shown, and described herein.
Figure 9:
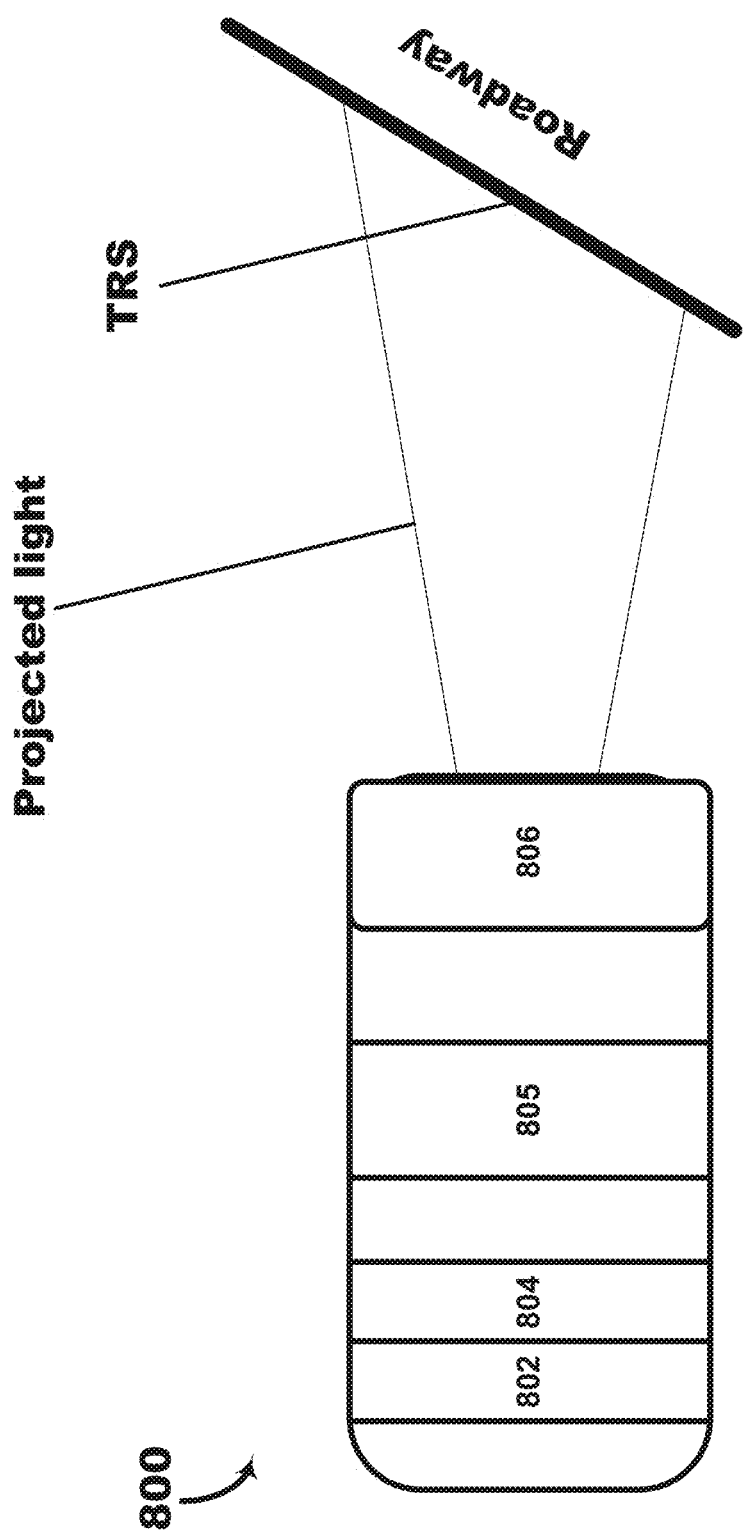
FIG. 9 illustrates a perspective view of an example light projection apparatus for implementation in the example vehicle light system, in accordance with one or more embodiments set forth, shown, and described herein.

FIGS. 8 and 9 illustrates an example light projection apparatus 800 is provided in accordance with one or more embodiments. In accordance with one or more embodiments, the example light projection apparatus 800 may be implemented as the front projection turn signal lights 162*e*, 162*g*, the rear projection turn signal lights 162*f*, 162*h*, and the brake light projection signal 162*k*, respectively. The light projection apparatus 800 may be oriented (e.g., through the dynamic control of the control engine 110 during operation of the vehicle 100) relative to the TRS and/or the vehicle structure 101 in a manner that projects light at a predetermined angle relative to the TRS. The predetermined angle may have a value greater than 45 degrees. Embodiments, however, are not limited thereto. This disclosure contemplates the predetermined angle having any value that optimizes or otherwise transforms the performance and functionality of the one or more embodiments in a manner that falls within the spirit and scope of the principles of this disclosure.

The light projection apparatus 800 has a sealed housing structure 801 mounted on the vehicle structure 101. Housed in the sealed housing structure 801 is a printed circuit board (PCB) 802 for operative control by the control engine 110.

The sealed housing structure 801 is formed of a material having excellent thermal management qualities. For example, such a material may be composed of a metal or metal composite exhibiting high thermal conductivity. Embodiments, however, are not limited thereto. This disclosure contemplates forming the sealed housing structure 801 of any material that optimizes or otherwise transforms the performance and functionality of the one or more embodiments in a manner that falls within the spirit and scope of the principles of this disclosure. The sealed housing structure 801 may be mechanically mounted on the vehicle structure 101 via suitable architecture such as, for example, a bracket, interference fit for insertion, etc. The PCB 802 may be potted using a potting compound with a vent patch to permit the release of heat therethrough. The rear left projected turn signal 162g and the rear right projected turn signal 162h may be mounted spatially above a cap cover of a vehicle license plate, or spatially below the actual vehicle license plate.

The light projection apparatus 800 further includes one or more light sources comprising light emitting diodes (LEDs) 804 are operatively connected to PCB 802. The control engine 110 is operable to modify an intensity of light emitted by the LEDs 804, and thus, the intensity of the projected light on the TRS. Modification of the intensity of light may be executed in response to the detected external driving environment of the vehicle 100. In one example, the intensity of light may be increased or decreased during certain ambient weather conditions (e.g., rain, snow, etc.), the type of TRS, the condition of the roadway surface (e.g., wet, dry, etc.), etc. One or more collimator lenses 805 are provided to collimate the light emitted by the LEDs 804. The one or more collimator lenses 805 may be formed of silicone. Embodiments, however, are not limited thereto. This disclosure contemplates forming the one or more collimator lenses 805 of any material that optimizes or otherwise transforms the performance and functionality of the one or more embodiments in a manner that falls within the spirit and scope of the principles of this disclosure.

A micro-lens array (MLA) projector 806 is spatially arranged adjacent to the one or more collimator members to generate and project the one or more graphical images, patterns, text, symbols, characters, geometric shapes, indicia, or combinations thereof. The MLA projector 806 facilitates shallow-angled projection of LED light from the LEDs 804 without optical distortion, thereby enabling the projection of light on a TRS to indicate vehicle turns and braking. One or more light-blocking bezel masks 807 are provided to support the MLA projector 806. A cover 803 is operatively connected to the one or more light-blocking bezel masks 807 to cover the MLA projector 806 and seal the MLA projector 806 from the ambient environment (e.g., dust, debris, rain, etc.).

Figure 10:
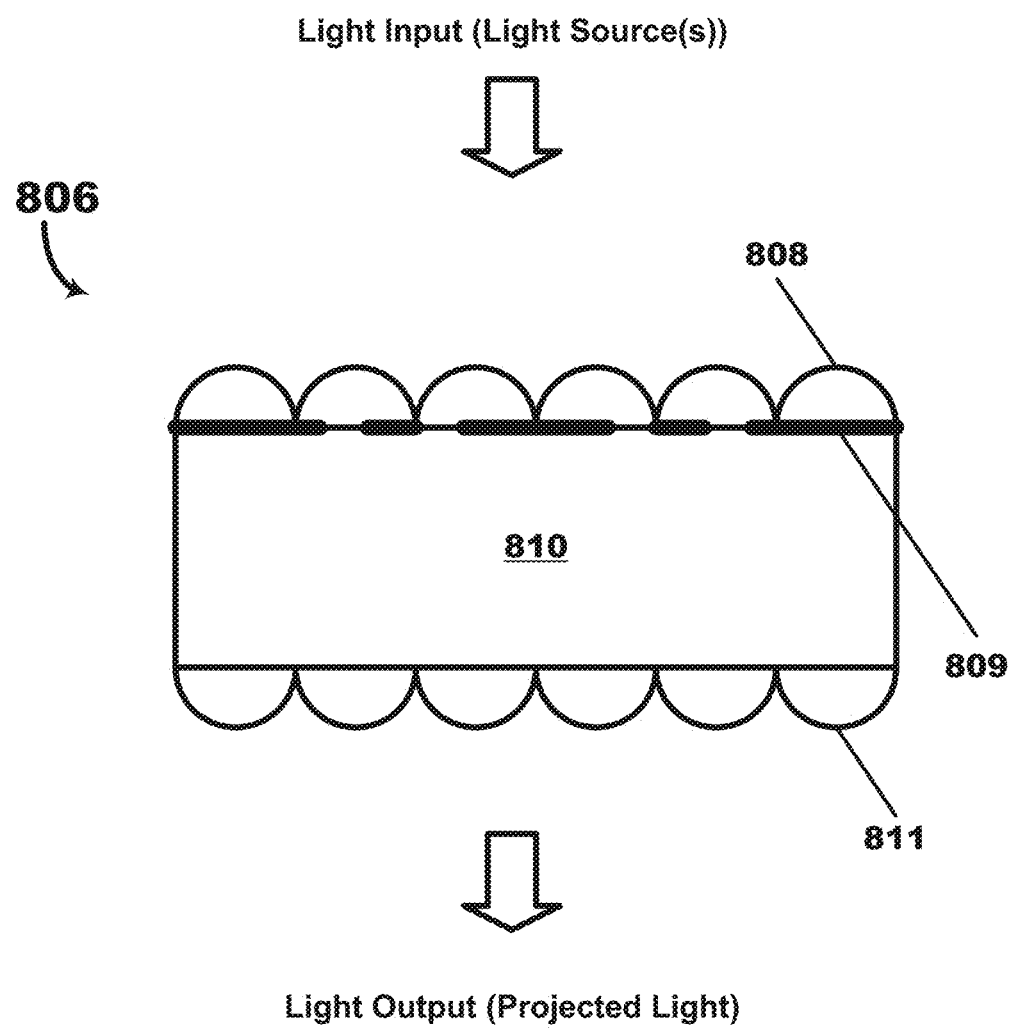
FIG. 10 illustrates a side sectional view of an example MLA projector for implementation in the example vehicle light system, in accordance with one or more embodiments set forth, shown, and described herein.

As illustrated in FIG. 10, the MLA projector 806 has a multi-layered structure that includes, but is not limited to: a first micro-lens layer 808 to receive the collimated light from the one or more collimator lenses 805, a mask layer 809 to filter the collimated light, a glass wafer 810, and a second micro-lens layer 811 to project the one or more graphical images, patterns, text, symbols, characters, geometric shapes, indicia, or combinations thereof, on the TRS during operation of the vehicle 100.

Figure 11:
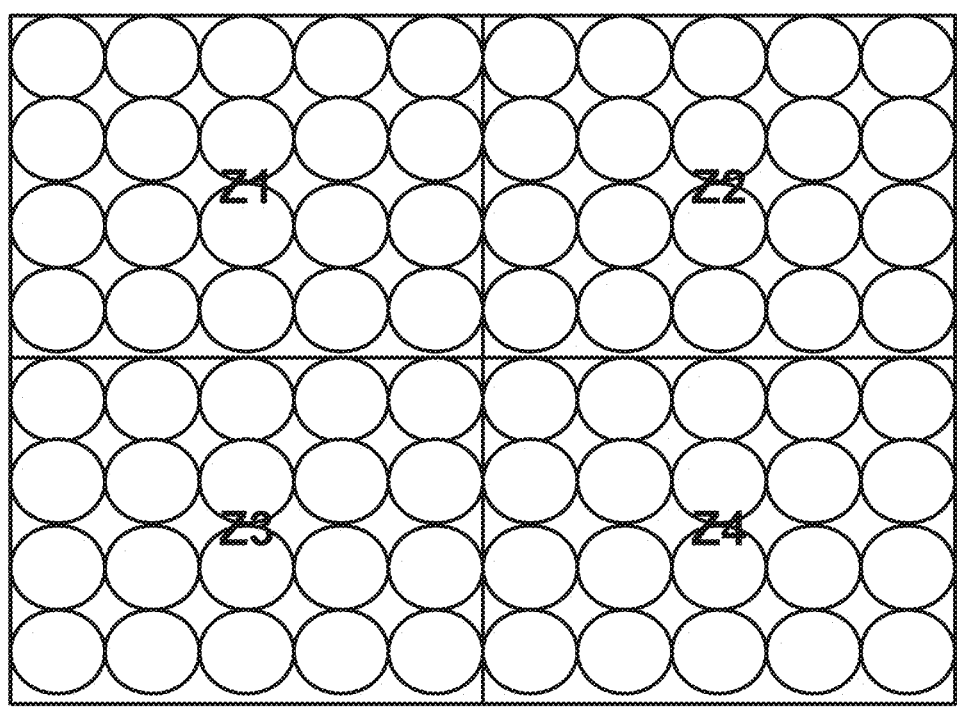
FIG. 11 illustrates a top view of an example mask layer of the example MLA projector of FIG. 10, the example mask layer having a plurality of zones with embedded patterns that form a projected graphical image.
Figure 12:
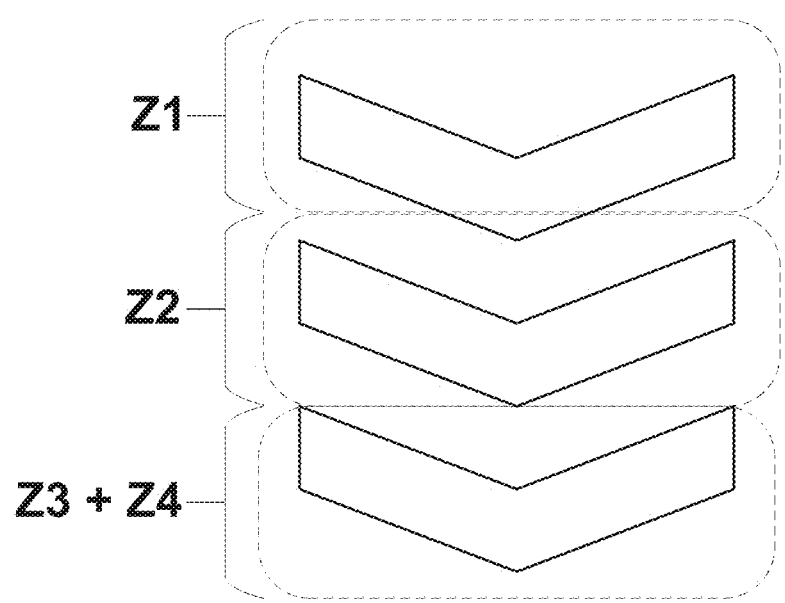
FIG. 12 illustrates a projected graphical image formed by the example vehicle light system.
Figure 13:
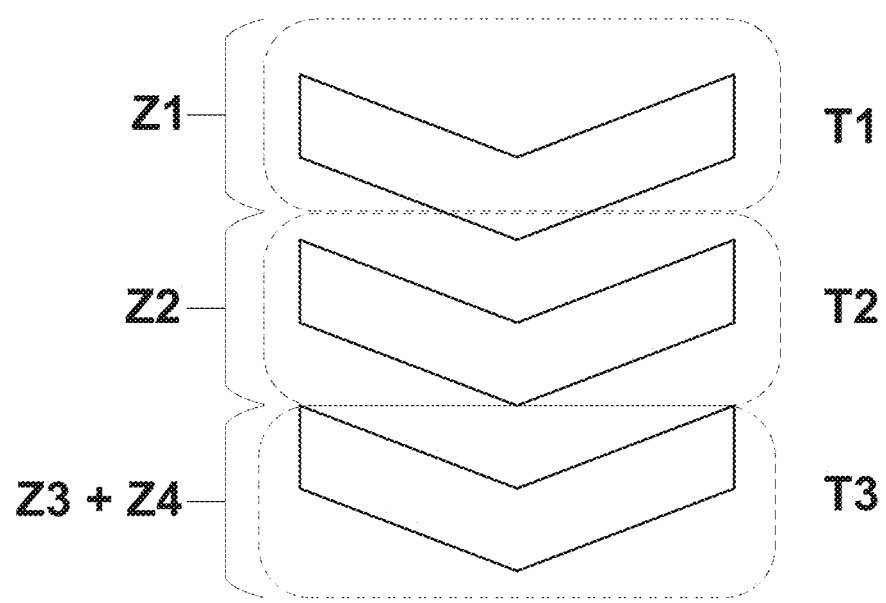
FIG. 13 illustrates a graphical image sequentially formed by the example the example vehicle light system.

As illustrated in FIGS. 11 through 13, in accordance with one or more example embodiments, the mask layer 809 may be formed of a metal such as, for example, chrome. Embodiments, however, are not limited thereto. This disclosure contemplates forming the mask layer 809 of any material that optimizes or otherwise transforms the performance and functionality of the one or more embodiments in a manner that falls within the spirit and scope of the principles of this disclosure. In the example embodiment, the mask layer 809 defines one or more zones Z1, Z2, Z3, Z4 through which light is to be filtered for projection on a TRS during operation of the vehicle 100.

In the example embodiment of FIG. 12, the one or more zones Z1, Z2, Z3, Z4 collectively form one or more patterns that themselves form the one or more graphical images, patterns, text, symbols, characters, geometric shapes, indicia, or combinations thereof to be projected on the TRS during operation of the vehicle 100.

In the example embodiment of FIG. 13, the light may be sequentially projected by the light projection apparatus 800 (via control by the control engine 110) to sequentially form the one or more graphical images, patterns, text, symbols, characters, geometric shapes, indicia, or combinations thereof. For instance, controlled projection of a first portion of the one or more graphical images, patterns, text, symbols, characters, geometric shapes, indicia, or combinations thereof formed by the first zone Z1 may occur in a first time period T1. Controlled projection of a second portion of the one or more graphical images, patterns, text, symbols, characters, geometric shapes, indicia, or combinations thereof formed by the second zone Z2 may occur in a second time period T2, where T2>T1. Controlled projection of a final portion of the one or more graphical images, patterns, text, symbols, characters, geometric shapes, indicia, or combinations thereof formed by the third zone Z3 and the fourth zone Z4 may occur in a third time period T3, where T3>T2. Although the illustrated example provides for a sequence order from Z1→Z2→Z3+Z4, embodiments are not limited thereto. This disclosure contemplates using any sequence order that optimizes or otherwise transforms the performance and functionality of the one or more embodiments in a manner that falls within the spirit and scope of the principles of this disclosure.

One or more computer-implemented methods may be implemented, for example, in logic instructions (e.g., software), configurable logic, fixed-functionality hardware logic, etc., or any combination thereof. Execution of the computer-implemented methods may be performed by the control engine 110.

FIGS. 14 through 18 respectively sets forth a computer-implemented method 1400, 1500, 1600, 1700, and 1800. In one or more examples, the flowchart of each computer-implemented method 1400, 1500, 1600, 1700, and 1800 may be implemented by the one or more processors 120 of the control engine 110. In particular, each computer-implemented method 1400, 1500, 1600, 1700, and 1800 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In accordance with one or more embodiments set forth, described, and/or illustrated herein, software executed by the control engine 110 provides functionality described or illustrated herein. In particular, software executed by the one or more processors 120 is operable to perform one or more processing blocks of each computer-implemented method 1400, 1500, 1600, 1700, and 1800 set forth, described, and/or illustrated herein, or provides functionality set forth, described, and/or illustrated. The process blocks set forth, described, and/or illustrated in each computer-implemented method 1400, 1500, 1600, 1700, and 1800 may be performed or executed in any combination.

Figure 14:
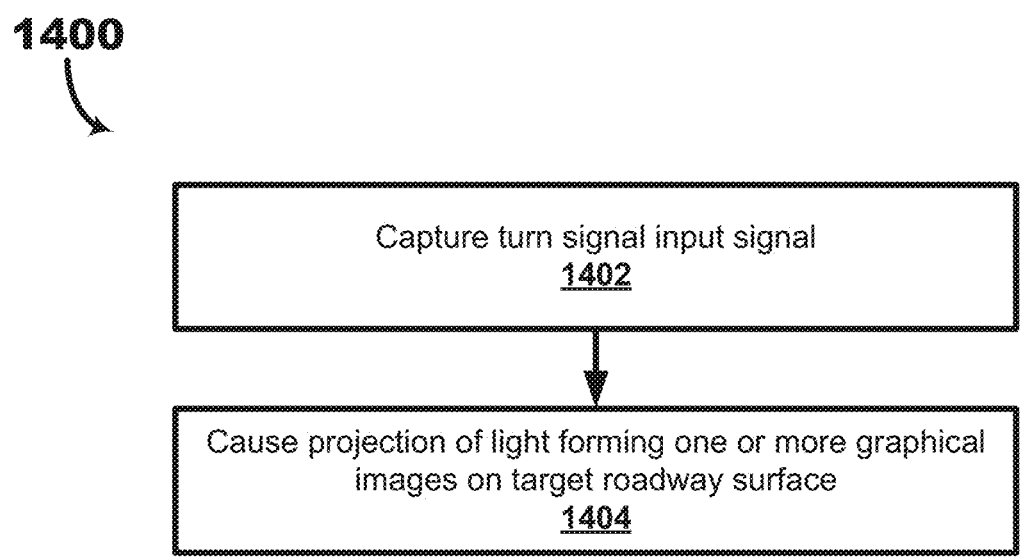
FIGS. 14 through 18 respectively illustrate a computer-implemented method of operating a vehicle, in accordance with one or more embodiments set forth and described herein.

As illustrated in FIG. 14, illustrated process block 1402 of computer-implemented method 1400 includes capturing, during operation of a vehicle (e.g., vehicle 100) on a roadway, a turn input signal (e.g., turn input signals 201, 202) that is indicative of implementation of a vehicle maneuver.

The computer-implemented method 1400 may then proceed to illustrated process block 1404, which includes causing, in response to the capture of the turn signal input, at least one light projection apparatus (e.g. at least one light projection apparatus 800) to project light forming one or more graphical images on a TRS to visually indicate the intended or actual implementation of the vehicle maneuver.

In accordance with process block 1404, the vehicle maneuver comprises a change of lane by the vehicle and the at least one light projection apparatus comprises a front projection turn signal (e.g., front left projection turn signal 405, front right projection turn signal 406) and a rear projection turn signal (e.g., rear left projection turn signal 407, rear right projection turn signal 408).

In accordance with process block 1404, the front projection turn signal is caused to project light, from a front region of the vehicle, which is oriented in a direction orthogonal to a driving direction of the vehicle to visually indicate the change of lane by the vehicle.

In accordance with process block 1404, the front projection turn signal is contemporaneously caused to project light, from a rear region of the vehicle, which is oriented in a direction orthogonal to a driving direction of the vehicle to further visually indicate the change of lane by the vehicle.

In accordance with process block 1404, the at least one light projection apparatus is caused to project light in a predetermined sequence on the TRS.

Figure 15:
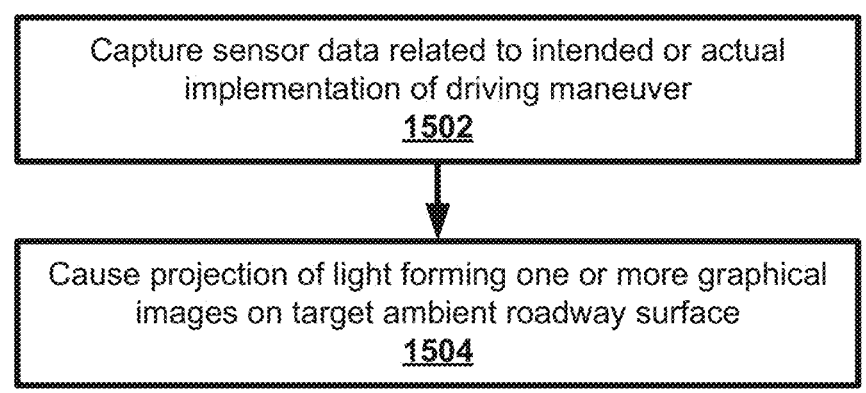

As illustrated in FIG. 15, illustrated process block 1502 of computer-implemented method 1500 includes capturing, during operation of a vehicle (e.g., vehicle 100) on a roadway, sensor data relating to intended or actual implementation of a vehicle maneuver.

The computer-implemented method 1500 may then proceed to illustrated process block 1504, which includes causing, in response to the capture of the sensor data, at least one light projection apparatus (e.g. at least one light projection apparatus 800) to project light forming one or more graphical images on a TRS to visually indicate the intended or actual implementation of the vehicle maneuver.

In accordance with process block 1504, the vehicle maneuver comprises a change of lane by the vehicle and the at least one light projection apparatus comprises a front projection turn signal (e.g., front left projection turn signal 405, front right projection turn signal 406) and a rear projection turn signal (e.g., rear left projection turn signal 407, rear right projection turn signal 408).

In accordance with process block 1504, the front projection turn signal is caused to project light, from a front region of the vehicle, which is oriented in a direction orthogonal to a driving direction of the vehicle to visually indicate the change of lane by the vehicle.

In accordance with process block 1504, the front projection turn signal is contemporaneously caused to project light, from a rear region of the vehicle, which is oriented in a direction orthogonal to a driving direction of the vehicle to further visually indicate the change of lane by the vehicle.

In accordance with process block 1504, the at least one light projection apparatus is caused to project light in a predetermined sequence on the TRS.

Figure 16:
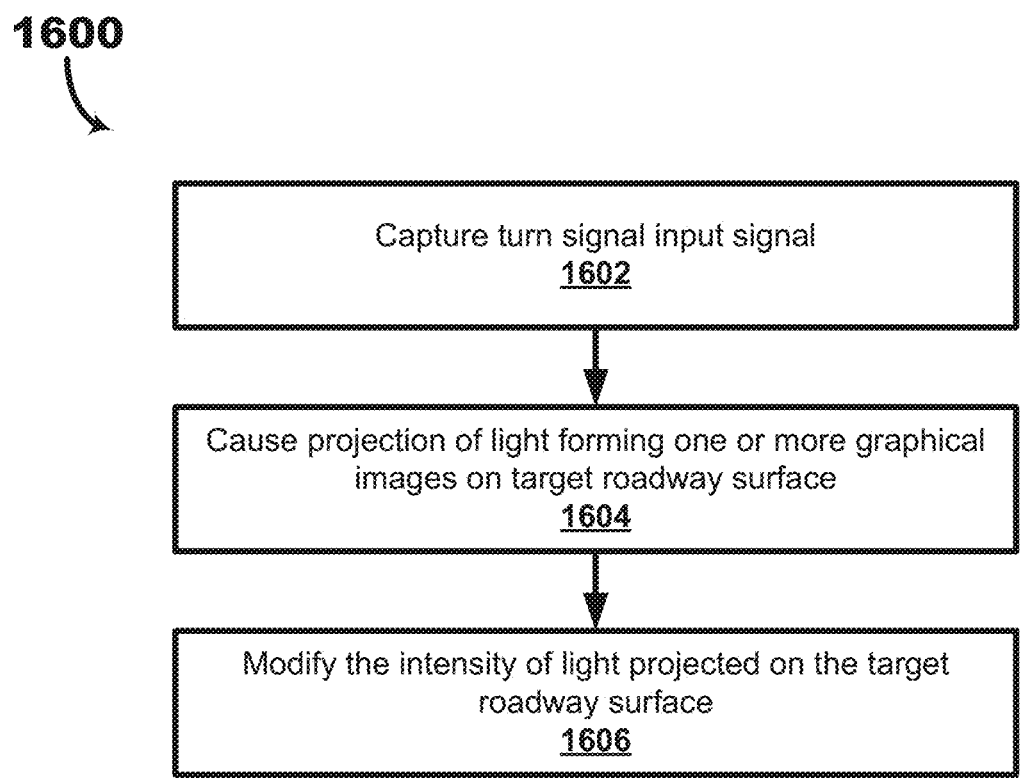

As illustrated in FIG. 16, illustrated process block 1602 of computer-implemented method 1600 includes capturing, during operation of a vehicle (e.g., vehicle 100) on a roadway, a turn input signal (e.g., turn input signals 201, 202) that is indicative of implementation of a vehicle maneuver.

The computer-implemented method 1600 may then proceed to illustrated process block 1604, which includes causing, in response to the capture of the turn signal input, at least one light projection apparatus (e.g. at least one light projection apparatus 800) to project light forming one or more graphical images on a TRS to visually indicate the intended or actual implementation of the vehicle maneuver.

In accordance with process block 1604, the vehicle maneuver comprises a change of lane by the vehicle and the at least one light projection apparatus comprises a front projection turn signal (e.g., front left projection turn signal 405, front right projection turn signal 406) and a rear projection turn signal (e.g., rear left projection turn signal 407, rear right projection turn signal 408).

In accordance with process block 1604, the front projection turn signal is caused to project light, from a front region of the vehicle, which is oriented in a direction orthogonal to a driving direction of the vehicle to visually indicate the change of lane by the vehicle.

In accordance with process block 1604, the front projection turn signal is contemporaneously caused to project light, from a rear region of the vehicle, which is oriented in a direction orthogonal to a driving direction of the vehicle to further visually indicate the change of lane by the vehicle.

In accordance with process block 1604, the at least one light projection apparatus is caused to project light in a predetermined sequence on the TRS.

The computer-implemented method 1600 may then proceed to illustrated process block 1606, which includes modifying an intensity of the projected light.

Figure 17:
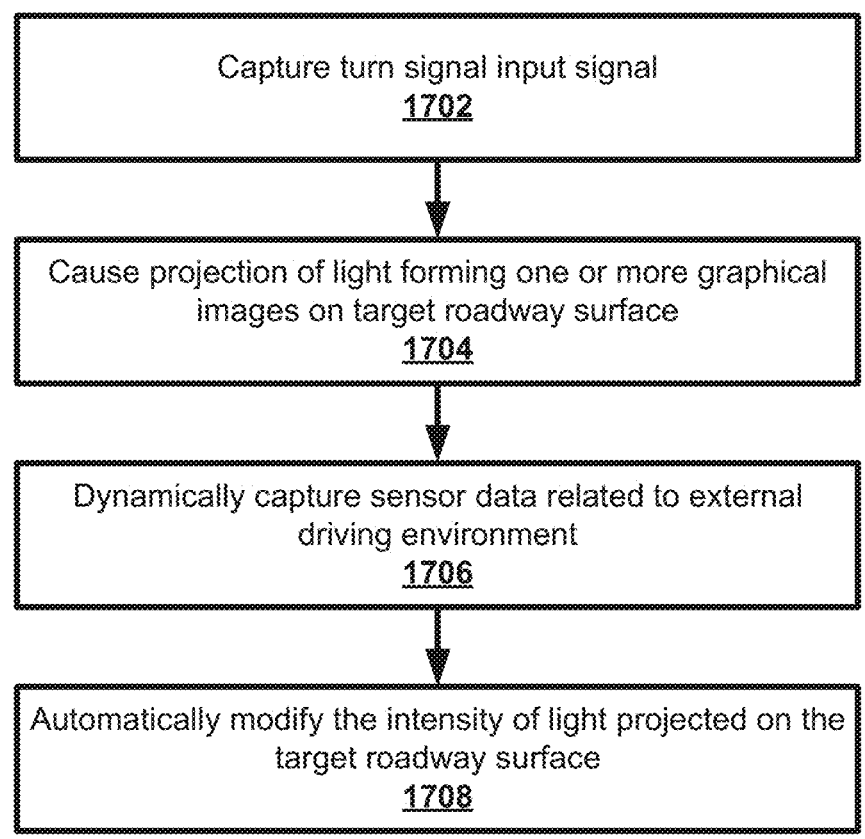

As illustrated in FIG. 17, illustrated process block 1702 of computer-implemented method 1700 includes capturing, during operation of a vehicle (e.g., vehicle 100) on a roadway, a turn input signal (e.g., turn input signals 201, 202) that is indicative of implementation of a vehicle maneuver.

The computer-implemented method 1700 may then proceed to illustrated process block 1704, which includes causing, in response to the capture of the turn signal input, at least one light projection apparatus (e.g. at least one light projection apparatus 800) to project light forming one or more graphical images on a TRS to visually indicate the intended or actual implementation of the vehicle maneuver.

In accordance with process block 1704, the vehicle maneuver comprises a change of lane by the vehicle and the at least one light projection apparatus comprises a front projection turn signal (e.g., front left projection turn signal 405, front right projection turn signal 406) and a rear projection turn signal (e.g., rear left projection turn signal 407, rear right projection turn signal 408).

In accordance with process block 1704, the front projection turn signal is caused to project light, from a front region of the vehicle, which is oriented in a direction orthogonal to a driving direction of the vehicle to visually indicate the change of lane by the vehicle.

In accordance with process block 1704, the front projection turn signal is contemporaneously caused to project light, from a rear region of the vehicle, which is oriented in a direction orthogonal to a driving direction of the vehicle to further visually indicate the change of lane by the vehicle.

In accordance with process block 1704, the at least one light projection apparatus is caused to project light in a predetermined sequence on the TRS.

The computer-implemented method 1700 may then proceed to illustrated process block 1706, which includes dynamically capturing sensor data related to an external driving environment of the vehicle.

The computer-implemented method 1700 may then proceed to illustrated process block 1708, which includes automatically modifying, in response to the captured sensor data, an intensity of the projected light.

Figure 18:
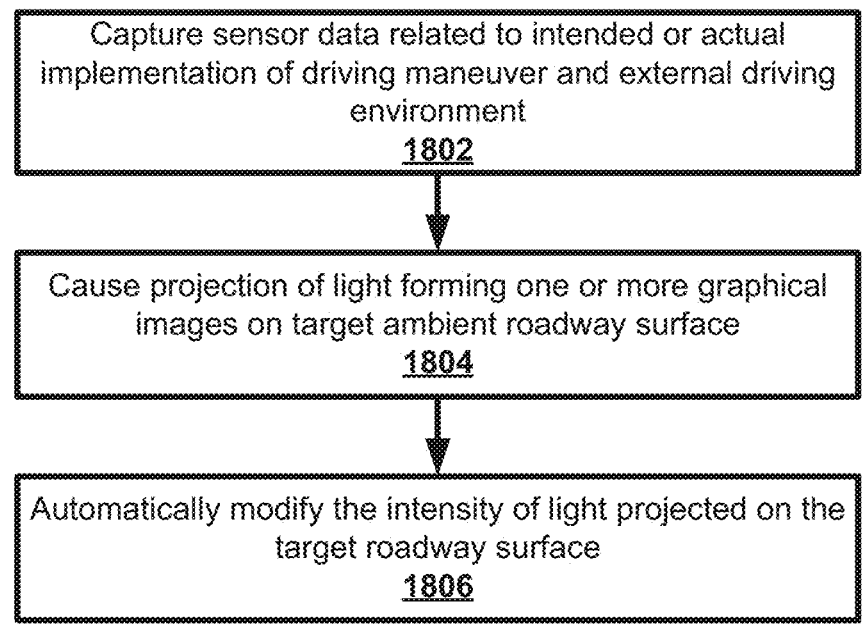

As illustrated in FIG. 18, illustrated process block 1802 of computer-implemented method 1800 includes capturing, during operation of a vehicle (e.g., vehicle 100) on a roadway, sensor data relating to intended or actual implementation of a vehicle maneuver and an external driving environment of the vehicle.

The computer-implemented method 1800 may then proceed to illustrated process block 1804, which includes causing, in response to the capture of the sensor data, at least one light projection apparatus (e.g. at least one light projection apparatus 800) to project light forming one or more graphical images on a TRS to visually indicate the intended or actual implementation of the vehicle maneuver.

In accordance with process block 1804, the vehicle maneuver comprises a change of lane by the vehicle and the at least one light projection apparatus comprises a front projection turn signal (e.g., front left projection turn signal 405, front right projection turn signal 406) and a rear projection turn signal (e.g., rear left projection turn signal 407, rear right projection turn signal 408).

In accordance with process block 1804, the front projection turn signal is caused to project light, from a front region of the vehicle, which is oriented in a direction orthogonal to a driving direction of the vehicle to visually indicate the change of lane by the vehicle.

In accordance with process block 1804, the front projection turn signal is contemporaneously caused to project light, from a rear region of the vehicle, which is oriented in a direction orthogonal to a driving direction of the vehicle to further visually indicate the change of lane by the vehicle.

In accordance with process block 1804, the at least one light projection apparatus is caused to project light in a predetermined sequence on the TRS.

The computer-implemented method 1800 may then proceed to illustrated process block 1806, which includes automatically modifying, in response to the captured sensor data related to the external driving environment of the vehicle, an intensity of the projected light.

The disclosure further includes additional notes and examples, as set forth in the following clauses.

APPARATUS

Clause 1. A vehicle light projection apparatus, comprising:
a projection light assembly operable to project of light in a predetermined sequence on a target roadway surface to form one or more graphical images, patterns, text, symbols, characters, geometric shapes, indicia, or combinations thereof oriented in a direction orthogonal to a driving direction of the vehicle to visually indicate the intended or actual implementation of the vehicle maneuver.

Clause 2. The vehicle light projection apparatus of Clause 1, further comprising a housing to receive the projection light assembly.

Clause 3. The vehicle light projection apparatus of Clause 1, wherein the projection light assembly comprises one or more light sources.

Clause 4. The vehicle light projection apparatus of Clause 3, wherein the one or more light sources comprises LEDs operatively connected to a printed circuit board (PCB).

Clause 5. The vehicle light projection apparatus of Clause 4, wherein the projection light assembly comprises one or more collimator members to collimate the light emitted by the LEDs.

Clause 6. The vehicle light projection apparatus of Clause 5, wherein the projection light assembly comprises a micro-lens array (MLA) arranged spatially adjacent to the one or more collimator members to generate and project the one or more graphical images, patterns, text, symbols, characters, geometric shapes, indicia, or combinations thereof.

Clause 7. The vehicle light projection apparatus of Clause 6, wherein the MLA has a multi-layered structure comprising: a first micro-lens layer to receive the collimated light from the one or more collimator members, a light-blocking mask to filter the collimated light, a glass wafer, and a second micro-lens layer to project the one or more graphical images, patterns, text, symbols, characters, geometric shapes, indicia, or combinations thereof on a target roadway surface.

Clause 8. The vehicle light projection apparatus of Clause 7, wherein the light-blocking mask defines one or more zones through which light is sequentially projected.

Clause 9. The vehicle light projection apparatus of Clause 8, wherein the one or more zones comprise one or more patterns forming the one or more graphical images, patterns, text, symbols, characters, geometric shapes, indicia, or combinations thereof to be projected on the target roadway surface.

Clause 10. The vehicle light projection apparatus of Clause 1, wherein the one or more graphical images, patterns, text, symbols, characters, geometric shapes, indicia, or combinations thereof comprise a symbol or a character.

Clause 11. The vehicle light projection apparatus of Clause 1, wherein the vehicle maneuver comprises a change of lane by the vehicle.

Clause 12. The vehicle light projection apparatus of Clause 1, wherein the vehicle maneuver comprises a left turn or a right turn of the vehicle.

Clause 13. The vehicle light projection apparatus of Clause 1, wherein the vehicle maneuver comprises braking of the vehicle.

Clause 14. The vehicle light projection apparatus of Clause 1, wherein the light engine is oriented to project light at a predetermined angle relative to the target roadway surface.

Systems

Clause 1. A vehicle light system, comprising: a front projection light apparatus, mounted at a forward vehicle mounting location, and operable to project light in a predetermined on a target roadway surface to form one or more graphical images, patterns, text, symbols, characters, geometric shapes, indicia, or combinations thereof oriented in a direction orthogonal to a driving direction of the vehicle to provide a first visual indication of an intended or actual implementation of a vehicle maneuver; and a rear projection light apparatus, mounted at a rear vehicle mounting location, and operable to project light in a predetermined on the target roadway surface to form one or more graphical images, patterns, text, symbols, characters, geometric shapes, indicia, or combinations thereof oriented in a direction orthogonal to a driving direction of the vehicle to provide a second visual indication of an intended or actual implementation of a vehicle maneuver.

Clause 2. The vehicle light system of Clause 1, wherein the front projection light apparatus and the rear projection light apparatus respectively comprises a housing composed of a thermally conductive material.

Clause 3. The vehicle light system of Clause 2, wherein the front projection light apparatus and the rear projection light apparatus respectively comprises one or more light sources received in the housing.

Clause 4. The vehicle light system of Clause 3, wherein the one or more light sources comprises LEDs electrically connected to a printed circuit board (PCB).

Clause 5. The vehicle light system of Clause 4, wherein the front projection light apparatus and the rear projection light apparatus respectively comprises one or more collimator members to collimate the light emitted by the LEDs.

Clause 6. The vehicle light system of Clause 5, wherein the front projection light apparatus and the rear projection light apparatus respectively comprises a micro-lens array (MLA) arranged spatially adjacent to the one or more collimator members to generate and project the one or more graphical images, patterns, text, symbols, characters, geometric shapes, indicia, or combinations thereof.

Clause 7. The vehicle light system of Clause 6, wherein the MLA has a multi-layered structure comprising: a first micro-lens layer to receive the collimated light from the one or more collimator members, a light-blocking mask member to filter the collimated light, a glass wafer, and a second micro-lens layer to project the one or more graphical images, patterns, text, symbols, characters, geometric shapes, indicia, or combinations thereof on the target roadway surface.

Clause 8. The vehicle light system of Clause 7, wherein the light-blocking mask defines one or more zones through which light is sequentially projected.

Clause 9. The vehicle light system of Clause 8, wherein the one or more zones comprise one or more patterns forming the one or more graphical images, patterns, text, symbols, characters, geometric shapes, indicia, or combinations thereof to be projected on the target roadway surface.

Clause 10. The vehicle light system of Clause 7, wherein the light-blocking mask member comprises one or more patterns forming the one or more graphical images, patterns, text, symbols, characters, geometric shapes, indicia, or combinations thereof to be projected on the target roadway surface.

Clause 11. The vehicle light system of Clause 10, wherein the one or more graphical images, patterns, text, symbols, characters, geometric shapes, indicia, or combinations thereof comprise a symbol or a character.

Clause 12. The vehicle light system of Clause 7, wherein the front projection light assembly and the rear projection light assembly respectively comprises a light-blocking bezel mask which supports the MLA.

Clause 13. The vehicle light system of Clause 12, wherein the front projection light apparatus and the rear projection light apparatus respectively comprises a cover operatively connected to the light-blocking bezel mask to cover the MLA.

Clause 14. The vehicle light system of Clause 1, wherein the vehicle maneuver comprises a change of lane by the vehicle.

Clause 15. The vehicle light system of Clause 1, wherein the vehicle maneuver comprises a left turn or a right turn of the vehicle.

Clause 16. The vehicle light system of Clause 1, wherein the vehicle maneuver comprises braking of the vehicle.

Clause 17. The vehicle light system of Clause 1, wherein the light engine is oriented to project light at a predetermined angle relative to the target roadway surface.

Clause 18. A vehicle light system, comprising: one or more light projection apparatus; and a control engine operatively connected to the one or more light apparatus, the control engine comprising one or more processors to control an operating mode of the one or more light engines, the control engine including one or more processors and a non-transitory memory operatively coupled to the one or more processors comprising a set of instructions executable by the one or more processors to cause the control engine to: acquire/receive an input signal corresponding to an intended or actual implementation of a vehicle maneuver; and cause, responsive to the acquisition/receipt, a projection of light in a predetermined on a target roadway surface to form one or more graphical images, patterns, text, symbols, characters, geometric shapes, indicia, or combinations thereof oriented in a direction orthogonal to a driving direction of the vehicle to visually indicate the intended or actual implementation of the vehicle maneuver.

Clause 19. A vehicle light system, comprising: one or more light projection apparatus; and a control engine operatively connected to the one or more light projection apparatus, the control engine comprising one or more processors to control an operating mode of the one or more light projection apparatus, the control engine including one or more processors and a non-transitory memory operatively coupled to the one or more processors comprising a set of instructions executable by the one or more processors to cause the control engine to: dynamically detect a vehicle maneuver; and cause, responsive to the detection, a projection of light in a predetermined on a target roadway surface to form one or more graphical images, patterns, text, symbols, characters, geometric shapes, indicia, or combinations thereof oriented in a direction orthogonal to a driving direction of the vehicle to visually indicate the intended or actual implementation of the vehicle maneuver.

Clause 20. A vehicle light system, comprising: one or more light projection apparatus; and a control engine operatively connected to the one or more light projection apparatus, the control engine comprising one or more processors to control an operating mode of the one or more light projection apparatus, the control engine including one or more processors and a non-transitory memory operatively coupled to the one or more processors comprising a set of instructions executable by the one or more processors to cause the control engine to: cause, responsive to acquiring/receiving an input signal corresponding to an intended or actual implementation of a vehicle maneuver, a projection of light in a predetermined on a target roadway surface to form one or more graphical images, patterns, text, symbols, characters, geometric shapes, indicia, or combinations thereof oriented in a direction orthogonal to a driving direction of the vehicle to visually indicate the intended or actual implementation of the vehicle maneuver.

Clause 21. A vehicle light system, comprising: one or more light projection apparatus; and a control engine operatively connected to the one or more light projection apparatus, the control engine comprising one or more processors to control an operating mode of the one or more light projection apparatus, the control engine including one or more processors and a non-transitory memory operatively coupled to the one or more processors comprising a set of instructions executable by the one or more processors to cause the control engine to: transmit, responsive to acquiring/receiving an input signal corresponding to an intended or actual implementation of a vehicle maneuver, one or more control output signal to a light control engine to cause a projection of light in a predetermined sequence on a target roadway surface to visually indicate an intended or actual implementation of the vehicle maneuver.

Clause 22. A vehicle light system, comprising: one or more light projection apparatus; and a control engine operatively connected to the one or more light projection apparatus, the control engine comprising one or more processors to control an operating mode of the one or more light projection apparatus, the control engine including one or more processors and a non-transitory memory operatively coupled to the one or more processors comprising a set of instructions executable by the one or more processors to cause the control engine to: detect an intended or actual implementation of a vehicle maneuver; and concurrently cause, responsive to the detection, a turn signal to project light to visually indicate an intended or actual implementation of the vehicle maneuver, and a projection turn signal to project light in a predetermined sequence on a target roadway surface to form one or more graphical images, patterns, text, symbols, characters, geometric shapes, indicia, or combinations thereof oriented in a direction orthogonal to a driving direction of the vehicle to visually indicate the intended or actual implementation of the vehicle maneuver.

Clause 23. A vehicle light system, comprising: one or more light projection apparatus; and a control engine operatively connected to the one or more light projection apparatus, the control engine comprising one or more processors to control an operating mode of the one or more light projection apparatus, the control engine including one or more processors and a non-transitory memory operatively coupled to the one or more processors comprising a set of instructions executable by the one or more processors to cause the control engine to: concurrently cause, responsive to acquiring/receiving an input signal corresponding to an intended or actual implementation of a vehicle maneuver, a turn signal to project light to visually indicate an intended or actual implementation of the vehicle maneuver, and a projection turn signal to project light in a predetermined sequence on a target roadway surface to form one or more graphical images, patterns, text, symbols, characters, geometric shapes, indicia, or combinations thereof oriented in a direction orthogonal to a driving direction of the vehicle to visually indicate the intended or actual implementation of the vehicle maneuver.

Clause 24. A vehicle light system, comprising: one or more light projection apparatus; and a control engine operatively connected to the one or more light projection apparatus, the control engine comprising one or more processors to control an operating mode of the one or more light projection apparatus, the control engine including one or more processors and a non-transitory memory operatively coupled to the one or more processors comprising a set of instructions executable by the one or more processors to cause the control engine to: concurrently transmit, responsive to acquiring/receiving an input signal corresponding to an intended or actual implementation of a vehicle maneuver, a first control output signal to a turn signal to project light to visually indicate an intended or actual implementation of the vehicle maneuver and a second control output signal to project light in a predetermined sequence on a target roadway surface to form one or more graphical images, patterns, text, symbols, characters, geometric shapes, indicia, or combinations thereof oriented in a direction orthogonal to a driving direction of the vehicle to visually indicate the intended or actual implementation of the vehicle maneuver.

Methods

Clause 1. A computer-implemented method of operating a vehicle, the computer-implemented method comprising: acquiring/receiving an input signal corresponding to an intended or actual implementation of a vehicle maneuver; and causing, responsive to the acquisition/receipt, a projection of light in a predetermined sequence on a target roadway surface to form one or more graphical images, patterns, text, symbols, characters, geometric shapes, indicia, or combinations thereof oriented in a direction generally orthogonal to a driving direction of the vehicle to visually indicate the intended or actual implementation of the vehicle maneuver.

Clause 2. A computer-implemented method of operating a vehicle, the computer-implemented method comprising: detecting an intended or actual implementation of a vehicle maneuver; and causing, responsive to the detection, a projection of light in a predetermined sequence on a projection/road surface to visually indicate the intended or actual implementation of the vehicle maneuver, the light forming one or more graphical images, patterns, text, symbols, characters, geometric shapes, indicia, or combinations thereof oriented in a direction orthogonal to a driving direction of the vehicle.

Clause 3. A computer-implemented method of operating a vehicle, the computer-implemented method comprising: causing, responsive to acquiring/receiving an input signal corresponding to an intended or actual implementation of a vehicle maneuver, a projection of light in a predetermined sequence on a target roadway surface to form one or more graphical images, patterns, text, symbols, characters, geometric shapes, indicia, or combinations thereof oriented in a direction orthogonal to a driving direction of the vehicle to visually indicate the intended or actual implementation of the vehicle maneuver.

Clause 4. A computer-implemented method of operating a vehicle, the computer-implemented method comprising: transmitting, responsive to acquiring/receiving an input signal corresponding to an intended or actual implementation of a vehicle maneuver, one or more control output signals to cause a projection of light in a predetermined sequence on a target roadway surface to visually indicate an intended or actual implementation of the vehicle maneuver.

Clause 5. A computer-implemented method of operating a vehicle, the computer-implemented method comprising: dynamically detecting an intended or actual implementation of a vehicle maneuver; and concurrently causing, responsive to the detection, a turn signal to project light to visually indicate an intended or actual implementation of the vehicle maneuver, and a projection turn signal to project light in a predetermined sequence on a target roadway surface to form one or more graphical images, patterns, text, symbols, characters, geometric shapes, indicia, or combinations thereof oriented in a direction orthogonal to a driving direction of the vehicle to visually indicate the intended or actual implementation of the vehicle maneuver.

Clause 6. A computer-implemented method of operating a vehicle, the computer-implemented method comprising: concurrently causing, responsive to acquiring/receiving an input signal corresponding to an intended or actual implementation of a vehicle maneuver, a turn signal to project light to visually indicate an intended or actual implementation of the vehicle maneuver, and a projection turn signal to project light in a predetermined sequence on a target roadway surface to form one or more graphical images, patterns, text, symbols, characters, geometric shapes, indicia, or combinations thereof oriented in a direction orthogonal to a driving direction of the vehicle to visually indicate the intended or actual implementation of the vehicle maneuver.

Clause 7. A computer-implemented method of operating a vehicle, the computer-implemented method comprising: concurrently transmit, responsive to acquiring/receiving an input signal corresponding to an intended or actual implementation of a vehicle maneuver, a first control output signal to a turn signal to project light to visually indicate an intended or actual implementation of the vehicle maneuver and a second control output signal to project light in a predetermined sequence on a target roadway surface to form one or more graphical images, patterns, text, symbols, characters, geometric shapes, indicia, or combinations thereof oriented in a direction orthogonal to a driving direction of the vehicle to visually indicate the intended or actual implementation of the vehicle maneuver.

Computer Program Products

Clause 1. A computer program product comprising at least one non-transitory computer readable medium having with a set of instructions of computer-executable program code, which when executed by one or more processors of a computing device, cause the computing device to: acquire/receive an input signal corresponding to an intended or actual implementation of a vehicle maneuver; and cause, responsive to the acquisition/receipt, a projection of light in a predetermined sequence on a target roadway surface to form one or more graphical images, patterns, text, symbols, characters, geometric shapes, indicia, or combinations thereof oriented in a direction generally orthogonal to a driving direction of the vehicle to visually indicate the intended or actual implementation of the vehicle maneuver.

Clause 2. A computer program product comprising at least one non-transitory computer readable medium having with a set of instructions of computer-executable program code, which when executed by one or more processors of a computing device, cause the computing device to: detect an intended or actual implementation of a vehicle maneuver; and cause, responsive to the detection, a projection of light in a predetermined sequence on a projection/road surface to visually indicate the intended or actual implementation of the vehicle maneuver, the light forming one or more graphical images, patterns, text, symbols, characters, geometric shapes, indicia, or combinations thereof oriented in a direction orthogonal to a driving direction of the vehicle.

Clause 3. A computer program product comprising at least one non-transitory computer readable medium having with a set of instructions of computer-executable program code, which when executed by one or more processors of a computing device, cause the computing device to: cause, responsive to acquiring/receiving an input signal corresponding to an intended or actual implementation of a vehicle maneuver, a projection of light in a predetermined sequence on a target roadway surface to form one or more graphical images, patterns, text, symbols, characters, geometric shapes, indicia, or combinations thereof oriented in a direction orthogonal to a driving direction of the vehicle to visually indicate the intended or actual implementation of the vehicle maneuver.

Clause 4. A computer program product comprising at least one non-transitory computer readable medium having with a set of instructions of computer-executable program code, which when executed by one or more processors of a computing device, cause the computing device to: transmit, responsive to acquiring/receiving an input signal corresponding to an intended or actual implementation of a vehicle maneuver, one or more control output signals to cause a projection of light in a predetermined sequence on a target roadway surface to visually indicate an intended or actual implementation of the vehicle maneuver.

Clause 5. A computer program product comprising at least one non-transitory computer readable medium having with a set of instructions of computer-executable program code, which when executed by one or more processors of a computing device, cause the computing device to: dynamically detect an intended or actual implementation of a vehicle maneuver; and concurrently cause, responsive to the detection, a turn signal to project light to visually indicate an intended or actual implementation of the vehicle maneuver, and a projection turn signal to project light in a predetermined sequence on a target roadway surface to form one or more graphical images, patterns, text, symbols, characters, geometric shapes, indicia, or combinations thereof oriented in a direction orthogonal to a driving direction of the vehicle to visually indicate the intended or actual implementation of the vehicle maneuver.

Clause 6. A computer program product comprising at least one non-transitory computer readable medium having with a set of instructions of computer-executable program code, which when executed by one or more processors of a computing device, cause the computing device to: concurrently cause, responsive to acquiring/receiving an input signal corresponding to an intended or actual implementation of a vehicle maneuver, a turn signal to project light to visually indicate an intended or actual implementation of the vehicle maneuver, and a projection turn signal to project light in a predetermined sequence on a target roadway surface to form one or more graphical images, patterns, text, symbols, characters, geometric shapes, indicia, or combinations thereof oriented in a direction orthogonal to a driving direction of the vehicle to visually indicate the intended or actual implementation of the vehicle maneuver.

Clause 7. A computer program product comprising at least one non-transitory computer readable medium having with a set of instructions of computer-executable program code, which when executed by one or more processors of a computing device, cause the computing device to: concurrently transmit, responsive to acquiring/receiving an input signal corresponding to an intended or actual implementation of a vehicle maneuver, a first control output signal to a turn signal to project light to visually indicate an intended or actual implementation of the vehicle maneuver and a second control output signal to project light in a predetermined sequence on a target roadway surface to form one or more graphical images, patterns, text, symbols, characters, geometric shapes, indicia, or combinations thereof oriented in a direction orthogonal to a driving direction of the vehicle to visually indicate the intended or actual implementation of the vehicle maneuver.

The terms "coupled," "attached," or "connected" may be used herein to refer to any type of relationship, direct or indirect, between the components in question, and may apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A vehicle, comprising:
   at least one light projection apparatus, and
   a control engine including one or more processors and a non-transitory memory coupled to the one or more processors, the non-transitory memory including a set of instructions, which when executed by the one or more processors, cause the one or more processors to:
   capture, during operation of the vehicle on a roadway, a turn input signal that is indicative of implementation of a vehicle maneuver;
   cause, in response to the capture of the turn input signal, the at least one light projection apparatus to generate and project light forming one or more graphical images on a target roadway surface to visually indicate the intended or actual implementation of the vehicle maneuver; and
   control an orientation of the at least one light projection apparatus relative to the target roadway surface in a manner that generates and projects light at a predetermined angle relative to the target roadway surface.

2. The vehicle of claim 1, wherein the vehicle maneuver comprises a change of lane by the vehicle.

3. The vehicle of claim 2, wherein the at least one light projection apparatus comprises a front projection turn signal and a rear projection turn signal.

4. The vehicle of claim 3, wherein the set of instructions, which when executed by the one or more processors, cause the one or more processors to cause the front projection turn signal to generate and project light from a front region of the vehicle which is oriented in a direction orthogonal to a driving direction of the vehicle to visually indicate the change of lane by the vehicle.

5. The vehicle of claim 4, wherein the set of instructions, which when executed by the one or more processors, cause the one or more processors to contemporaneously cause the rear projection turn signal to generate and project light from a rear region of the vehicle which is oriented in a direction orthogonal to a driving direction of the vehicle to further visually indicate the change of lane by the vehicle.

6. The vehicle of claim 1, wherein the set of instructions, which when executed by the one or more processors, cause the one or more processors to cause the generation and projection of light in a predetermined sequence on the target roadway surface.

7. The vehicle of claim 1, wherein the set of instructions, which when executed by the one or more processors, cause the control engine-one or more processors to modify, in response to a detected external driving environment of the vehicle, an intensity of the projected light.

8. A vehicle light system, comprising:
   a light projection apparatus that includes
   a housing structure mounted on a vehicle structure;
   a printed circuit board (PCB) arranged in the housing structure;
   one or more light sources operatively connected to the PCB in the housing structure to emit light;
   one or more collimator lenses arranged in the housing structure to collimate the light emitted by the one or more light sources; and
   a micro-lens array (MLA) projector to generate and project, using the collimated light, one or more graphical images on a target roadway surface to visually indicate an intended or actual implementation of a vehicle maneuver by the vehicle; and
   a control engine including one or more processors and a non-transitory memory coupled to the one or more processors, the non-transitory memory including a set of instructions, which when executed by the one or more processors, cause the one or more processors to:
   capture, during operation of the vehicle on a roadway, a turn input signal that is indicative of implementation of a vehicle maneuver,
   cause, in response to the capture of the turn input signal, the at least one light projection apparatus to generate and project light forming one or more graphical images on a target roadway surface to visually indicate the intended or actual implementation of the vehicle maneuver, and control an orientation of the at least one light projection apparatus relative to the target roadway surface in a manner that generates and projects light at a predetermined angle relative to the target roadway surface.

9. The vehicle light system of claim 8, further comprising one or more light-blocking bezel masks to support the MLA projector.

10. The vehicle light system of claim 9, further comprising a cover operatively connected to the one or more light-blocking bezel masks to cover the MLA projector and seal the MLA projector.

11. The vehicle light system of claim 9, wherein the MLA projector comprises a multi-layered structure that includes:
a first micro-lens layer to receive the collimated light from the one or more collimator lenses,
a mask layer to filter the collimated light,
a glass wafer, and
a second micro-lens layer to project the one or more graphical images.

12. The vehicle light system of claim 11, wherein the mask layer defines one or more zones through which the collimated light is filtered.

13. The vehicle light system of claim 12, wherein the one or more zones collectively form one or more patterns that forms the one or more graphical images.

14. A computer program product comprising at least one non-transitory computer readable medium having with a set of instructions of computer-executable program code, which when executed by one or more processors of a control engine, cause the one or more processors to:
capture, during operation of the vehicle on a roadway, a turn input signal that is indicative of implementation of a vehicle maneuver;
cause, in response to the capture of the turn input signal, at least one light projection apparatus of the vehicle to generate and project light forming one or more graphical images on a target roadway surface to visually indicate the intended or actual implementation of the vehicle maneuver; and
control an orientation of the at least one light projection apparatus relative to the target roadway surface in a manner that generates and projects light at a predetermined angle relative to the target roadway surface.

15. The computer program product of claim 14, wherein the set of instructions, which when executed by the one or more processors, cause the one or more processors to cause the at least one light projection apparatus to generate and project the light from a front region of the vehicle in a manner that is oriented in a direction orthogonal to a driving direction of the vehicle to visually indicate a change of lane by the vehicle.

16. The computer program product of claim 15, wherein the set of instructions, which when executed by the one or more processors, cause the one or more processors to contemporaneously cause the at least one light projection apparatus to generate and project the light from a rear region of the vehicle in a manner that is oriented in a direction orthogonal to a driving direction of the vehicle to further visually indicate the change of lane by the vehicle.

17. The computer program product of claim 14, wherein the set of instructions, which when executed by the one or more processors, cause the one or more processors to cause the generation and projection of light in a predetermined sequence on the target roadway surface.

18. The computer program product of claim 14, wherein the set of instructions, which when executed by the one or more processors, cause the one or more processors to modify, in response to a detected external driving environment of the vehicle, an intensity of the projected light.

* * * * *